US009639576B2

(12) United States Patent
Tokuda et al.

(10) Patent No.: US 9,639,576 B2
(45) Date of Patent: May 2, 2017

(54) DATABASE MANAGEMENT SYSTEM, COMPUTER, AND DATABASE MANAGEMENT METHOD

(75) Inventors: Seisuke Tokuda, Tokyo (JP); Akira Shimizu, Tokyo (JP); Michiko Yoshida, Tokyo (JP); Shinji Fujiwara, Tokyo (JP); Kazuhiko Mogi, Tokyo (JP); Masaru Kitsuregawa, Tokyo (JP); Kazuo Goda, Tokyo (JP)

(73) Assignees: Hitachi, Ltd., Tokyo (JP); The University of Tokyo, Tokyo (JP)

( * ) Notice: Subject to any disclaimer, the term of this patent is extended or adjusted under 35 U.S.C. 154(b) by 243 days.

(21) Appl. No.: 14/397,030

(22) PCT Filed: Apr. 27, 2012

(86) PCT No.: PCT/JP2012/061446
§ 371 (c)(1),
(2), (4) Date: Nov. 7, 2014

(87) PCT Pub. No.: WO2013/161081
PCT Pub. Date: Oct. 31, 2013

(65) Prior Publication Data
US 2015/0112965 A1 Apr. 23, 2015

(51) Int. Cl.
*G06F 17/30* (2006.01)
(52) U.S. Cl.
CPC .. *G06F 17/30463* (2013.01); *G06F 17/30483* (2013.01)
(58) Field of Classification Search
USPC .................................. 707/718, 713, 719–720
See application file for complete search history.

(56) References Cited

U.S. PATENT DOCUMENTS

2007/0022100 A1* 1/2007 Kitsuregawa ..... G06F 17/30433
2011/0022584 A1 1/2011 Kitsuregawa et al.

FOREIGN PATENT DOCUMENTS

JP 2007/034414 A 2/2007
JP 2007/065978 A 3/2007

OTHER PUBLICATIONS

Extended European Search Report received in corresponding European Application No. 12875311.8 dated Apr. 18, 2016.
(Continued)

*Primary Examiner* — Hung T Vy
(74) *Attorney, Agent, or Firm* — Mattingly & Malur, PC

(57) ABSTRACT

A database management system (DBMS) generates a query execution plan including information representing one or more database (DB) operations necessary for executing a query, and executes the query in accordance with the query execution plan. In the execution of the query, the DBMS dynamically generates tasks for executing the DB operations and executes the dynamically generated tasks. The query execution plan includes a plurality of query blocks, which are sets of one or more DB operations. When newly generating a task, the DBMS executes determination processing of simultaneous-task-generation number. The determination processing of simultaneous-task-generation number is to calculate, targeting each of the query blocks, the number of simultaneous task generation, which is the number of tasks simultaneously generatable as tasks for executing the query block. The number of the dynamically generated tasks is equal to or smaller than the number of simultaneous task generation.

14 Claims, 23 Drawing Sheets

(56) References Cited

OTHER PUBLICATIONS

Dong, F. et al., "Scheduling Algorithms for Grid Computing: State of the Art and Open Problems", Jan. 31, 2006, Retrieved from the Internet: URL: http://ftp.qucis.queensu.ca/TechReports/Reports/2006-504.pdf, Kingston, Ontario.

Idei et al., "Query Plan Riyo Sakiyomi Gijutsu ni Okeru Taju Shori Jikkoji no Seino Model Kento", The Institute of Electronics, Information and Communication Engineers Dai 18 Kai Data Kogaku Workshop Ronbunshu, Jun. 1, 2007.

* cited by examiner

Query

```
SELECT BC1
FROM B
WHERE B.B_Type = 'PPP'
      AND B.BC1 > AVG ( SELECT AC1
                        FROM A
                        WHERE A.A_Type = 'AAA' )
```

Fig. 8

Query execution management table
424

| Query block being executed | Priority | Highest priority flag | Target execution time | Execution start time | Number of execution tasks | Number of task generation-waiting tasks | Number execution-waiting tasks | Execution achievement ratio |
|---|---|---|---|---|---|---|---|---|
| Query block 1 | 3 | - | 60 min. | 14:32:11 | 300 | 100 | 0 | 25% |
| Query block 2 | 2 | - | 30 min. | 14:15:39 | 200 | 0 | 180 | 30% |
| Query block 3 | 5 | - | 10 min. | 14:35:41 | 500 | 100 | 0 | 12% |

| Allocated memory resource amount | Reserved memory resource amount | Unreserved memory resource amount | Allocatable total memory resource amount |
|---|---|---|---|
| 30MB | 30MB | 5MB | 100MB |
| 10MB | 20MB | | |
| 40MB | 45MB | | |

Query

```
SELECT BC1
FROM B
WHERE B.B_Type = 'PPP'
      AND EXISTS ( SELECT *
                   FROM A
                   WHERE A.AC2 = B.BC2
                         AND A.A_Type = 'AAA')
```

Fig. 27

Determine ratio among query blocks with respect to priority of entire query block and determine priority on the basis of any one of (p) to (t) below.  — S2210

(p) Reference relation among query blocks,
(q) ratios of memory resource amount required for execution of each query block and upper limit value of memory resource amount allocatable to query,
(r) contents of plurality of query blocks and contents and execution progress statuses of other query blocks being executed,
(s) in case of query block concerning sub-query having correlation condition, number of predicted DB operations in query block, predicted task execution multiplicity, or memory resource amount required for execution of task, and
(t) in case of query block concerning sub-query including EXISTS phrase having correlation condition, number of predicted DB operations of query block concerning outer side portion of query

DATABASE MANAGEMENT SYSTEM, COMPUTER, AND DATABASE MANAGEMENT METHOD

TECHNICAL FIELD

The present invention relates to a database management technique.

BACKGROUND ART

In enterprise activities, utilization of a large amount of generated business data is indispensable. Therefore, a system that analyzes a database (hereinafter, "DB") that stores a large amount of business data, has already been devised.

In this analysis processing, a database management system (hereinafter, "DBMS") receives a query and issues a data read request to storage devices that stores the DB.

As a technique for reducing latency for a data read in an execution of one query, a technique disclosed in PTL 1 is known. According to PTL 1, a DBMS dynamically generates tasks each time data required for query execution is read and executes the tasks in parallel in order to multiplex data read requests. The DBMS allocates, to the dynamically generated tasks, memory resources required for a database operation (hereinafter, "DB operation") executed by the tasks. According to PTL 1, the DBMS compares the number of existing tasks and a predetermined number, and holds off the generation of tasks when the number of existing tasks reaches the predetermined number.

CITATION LIST

Patent Literature

[PTL 1]
Japanese Patent Application Publication No. 2007-34414

SUMMARY OF INVENTION

Technical Problem

It is conceived that a system operation limits a maximum amount of memory resources that can be consumed for an execution of a query (allocatable memory resource amount). The memory resource amount consumed for an execution of one query depends on a DB operation executed in the dynamically generated task or the number of generated tasks and changes according to the progress of the execution of the query. Therefore, when a limitation is applied to the allocatable memory resource amount, it is desirable to appropriately determine an upper limit of the number of tasks that execute the query in parallel.

Under a circumstance where the technique of PTL 1 is applied, the DBMS generates a query execution plan including information representing one or more DB operations necessary for executing the query. The DBMS executes the query in accordance with the generated query execution plan.

The query execution plan sometimes includes a plurality of query blocks. The "query block" is a set of one or more DB operations among DB operations which are information included in the query execution plan. For example, in the case of a query including an aggregation processing such as SUM in a sub-query, a query execution plan of the query includes two query blocks: a query block concerning the sub-query and a query block concerning the remaining portion of the query (an outer side portion of the sub-query). The DBMS can execute, in parallel, the plurality of query blocks included in the query execution plan by executing each tasks.

For example, in the case of a query execution plan including two query blocks, one query block sometimes includes a DB operation which refers to an execution result of the other query block (e.g., an aggregation result concerning the sub-query). When the DBMS executes the DB operation according to tasks, the DBMS completes the execution of the other query block, and then, the DBMS can start execution of the DB operation. When the limitation is imposed on the allocatable memory resource amount, it is assumed that the DBMS equally allocates halves of the limited allocatable memory resource amount respectively to the execution of the two query blocks. In this case, the DBMS starts to execute the two query blocks in parallel by executing tasks. However, the task corresponding to the DB operation in the one query block cannot be started and is kept waiting until the execution of the other query block is completed. Then, memory resources allocated to the task remain being consumed, so, the limited memory resources cannot be effectively utilized. As a result, the multiplicity of task execution in the entire query execution, that is, the multiplicity of data read requests decreases and the time for query execution increases. Therefore, it is an object of the present invention to, concerning a query associated with a plurality of query blocks, effectively utilize limited memory resources and reduce an execution time of the query.

Solution to Problem

A DBMS includes a query receiving unit, a query execution plan generation unit, and a query execution unit. For example, the DBMS is a computer program and is executed by a computer to thereby establish the query receiving unit, the query execution plan generation unit, and the query execution unit in the computer.

The query receiving unit receives a query. The query execution plan generation unit generates a query execution plan including information representing one or more DB operations necessary for executing the query. The query execution plan includes a plurality of query blocks. The query block is a set of one or more DB operations among DB operations, which are information included in the query execution plan. The query execution unit executes the received query in accordance with the generated query execution plan.

In the execution of the query, the query execution unit dynamically generates tasks for executing the DB operations and executes the dynamically generated tasks. Specifically, for example, in the execution of the query, the query execution unit performs: (a) generating a task for executing the DB operation; (b) issuing a data read request to a DB in order to read data necessary for the DB operation corresponding to the generated task by executing the generated task; (c) when the (N+1)th DB operation is executed based on an execution result of the N-th DB operation corresponding to the task executed in (b) described above, newly generating a task based on the execution result (N is an integer equal to or larger than 1); and (d) performing (b) and (c) described above concerning the task newly generated. When two or more executable tasks are present in (b) and (d) described above, the query execution unit executes at least two tasks in parallel among the two or more tasks. This operation of the query execution unit may be an operation conforming to the technique disclosed in PTL 1.

In the execution of the query, the query execution unit performs determination processing of simultaneous-task-generation number when newly generating a task (e.g., in the case of (a) or (c) described above). The determination processing of simultaneous-task-generation number is calculating, targeting each query block, the number of simultaneous task generation, which is the number of tasks that can be simultaneously generated, as tasks for executing the query block. The query execution unit generates tasks equal to or fewer than the calculated number of simultaneous task generation.

Advantageous Effects of Invention

According to the present invention, according to effective utilization of limited memory resources, it is possible to reduce an execution time of a query related to a plurality of query blocks. For example, in an environment in which an allocatable memory resource amount is limited, it is possible to set the number of tasks dynamically generated during query execution to an appropriate number for each of the query blocks. Consequently, in an environment in which there is limitation on an allocatable memory resource amount, it is possible to expect that a data read request is issued with highest multiplicity within a range of the limitation. Therefore, it is possible to expect a reduction in a query execution time.

BRIEF DESCRIPTION OF DRAWINGS

FIG. 8 shows the configuration of a query execution management table according to Embodiment 1.
FIG. 25 shows a query according to Embodiment 2.
FIG. 27 shows a part of a flow of priority automatic change processing according to Embodiment 2.

DESCRIPTION OF EMBODIMENTS

Several embodiments will be described below with reference to the drawings. Note that the present invention is not limited by the following description. In the following description, a database is referred to as "DB", a database management system is referred to as "DBMS", and a server that executes the DBMS is referred to as "DB server". An issue source of a query to the DBMS may be a computer program (e.g., an application program) outside the DBMS. The outside computer program may be a program executed in the DE server or may be a program executed by an apparatus (e.g., a client computer) coupled to the DB server.

Embodiment 1

First, an overview of this embodiment will be described.
The DB server executes the DBMS. The DBMS receives a query and executes the received query. The DBMS returns a result generated by the execution to an issue source of the query. The DBMS executes one or more DB operations to generate the result of the query. In the execution of at least one DB operation among the DB operations, the DBMS sometimes issues a read request to a storage device that stores the DB.

Figure 1:
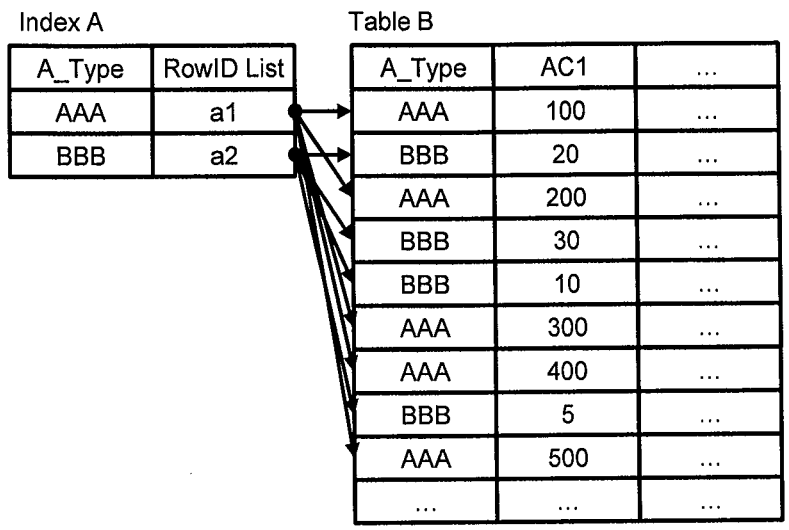
FIG. 1 shows an index A and a table A according to Embodiment 1.
Figure 2:
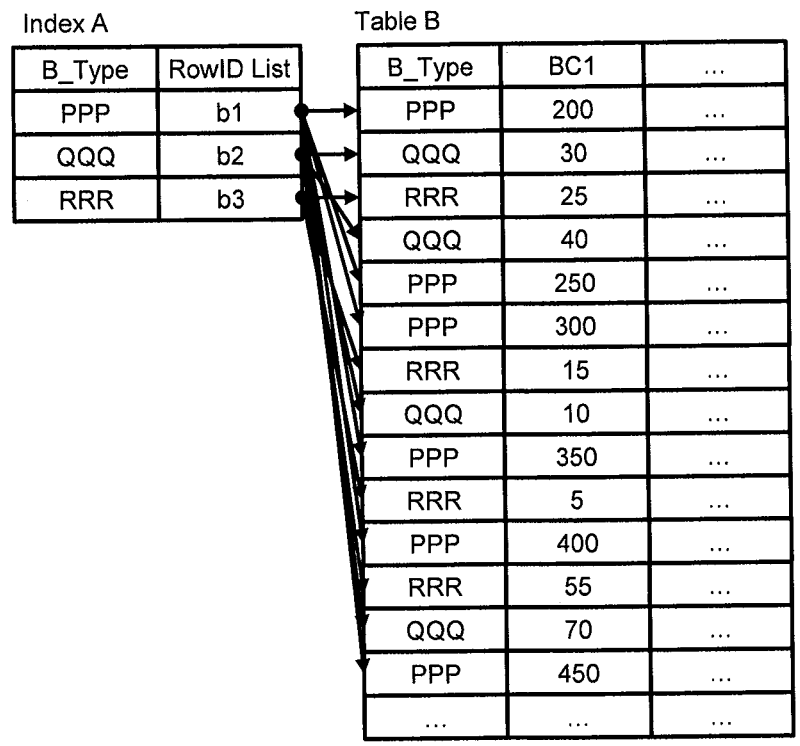
FIG. 2 shows an index B and a table B according to Embodiment 1.

For example, it is assumed that the DBMS stores, in the storage device (e.g., an external storage apparatus communicably coupled to the DB server), a DB including an index A, a table A, an index B, and a table B shown in FIG. 1 and FIG. 2. The table is a set of one or more records. The record is configured from one or more columns. The index is a data structure created targeting one or more columns in the table and increases the speed of access to the table according to a selection condition including the columns targeted by the index. For example, the index is a data structure that retains information (RowID) for specifying, for each value of the target columns, a record in the table including the value. A B-tree structure or the like is used.

For example, the DBMS can specify, using the index A, five records (a first record, a third record, a sixth record, a seventh record, and a ninth record) of the table A from a RowID List "a1", which is a set of RowIDs corresponding to a record, a value of which in a column A_Type of the table A is "AAA". As described above, the DBMS can specify, using a RowID List in a specific value of the column A_Type of the index A, a record including the value of A_Type from the table A and specify a value of a column AC1 included in the record. Similarly, the DBMS can specify, using a RowID List in a specific value of a column B_Type of the index B, a record including the value of B_Type from the table B and specify a value of a column BC1 included in the record.

Figures 3, 4:
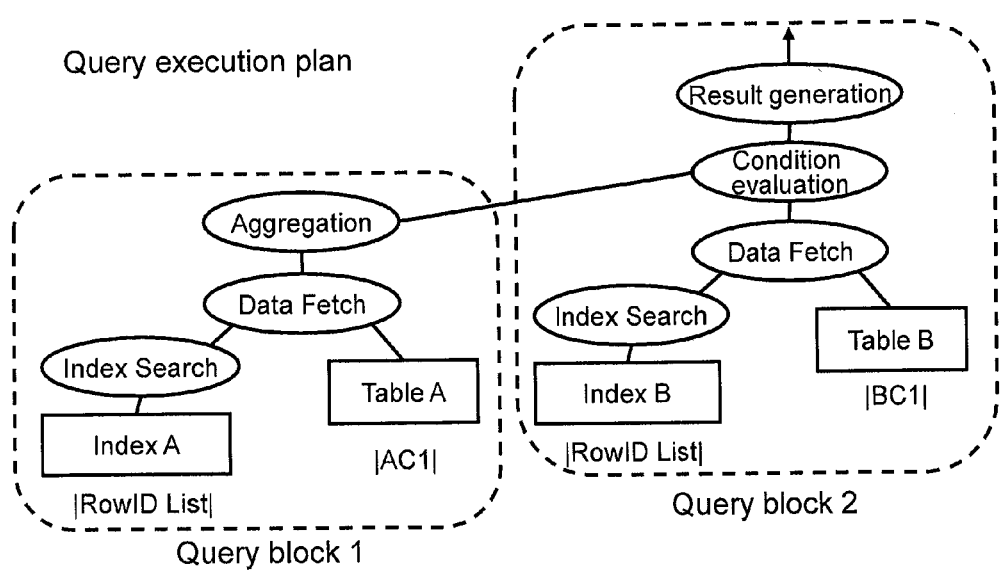
FIG. 3 shows a query according to Embodiment 1.
FIG. 4 shows a query execution plan according to Embodiment 1.

For example, it is assumed that the query received by the DBMS is a query shown in FIG. 3. The query in FIG. 3 is a query for extracting a value of a column BC1 of a record, a value of which in the column B_Type of the table B is "PPP", when the value of the column BC1 is a value larger than an average of values of a column AC1 of the record, the value of which in the column A_Type of the table A is "AAA". A description portion of AVG (SELECT . . . ) of the query shown in FIG. 3 corresponds to a sub-query. The sub-query in FIG. 3 does not have a correlation condition with an outer side portion of the sub-query. Presence or absence of the correlation condition means whether a description of a column of a table designated by a FROM phrase on the outer side of the sub-query is included in the sub-query.

In order to execute the query in FIG. 3, the DBMS generates, for example, a query execution plan shown in FIG. 4. The query execution plan includes, for example, information representing one or more DB operations involving data read. An order relation of a tree structure is present in execution order of the DB operations in the query execution plan. The DBMS extracts, in accordance with the query execution plan in FIG. 4, using the index A, values of the column AC1 of a record including a designated value of the column A_Type of the table A and calculates an average of the values. The DBMS extracts, using the index B, values of the column BC1 in a record including a designated value of the column B_Type of the table B. The DBMS selects the extracted values of the column BC1 larger than the calculated average and returns the value to a query issue source as a result of the query execution. For example, the DBMS performs the following processing for:

(S1) searching for, using the index A, a RowID List corresponding to the record of the table A including the designated value of the column A_Type,
(S2) fetching data including the corresponding record of the table A using the RowID List found in (S1) and extracting values of the column AC1 of the corresponding record,
(S3) calculating an average of all values of the column AC1 extracted in (S2),
(S4) searching for, using the index B, a RowID List corresponding to the record of the Table B including the designated value of the column B_Type,
(S5) fetching data including the corresponding record of the table B using the RowID List found in (S4) and extracting values of the column BC1 of the corresponding record,
(S6) selecting, among the values of the column BC1 extracted in (S5), the values larger than the average calculated in (S3), and
(S7) returning the selected values of the column BC1 to the query issue source as a result of the query execution.

The query execution plan shown in FIG. 4 includes a query block 1 corresponding to the execution of (S1) to (S3) and a query block 2 corresponding to the execution of (S4) to (S7). The "query block" is a set of one or more DB operations among DB operations executed in accordance with the query execution plan. As a query to be generated as a query execution plan including a plurality of query blocks, there are, for example, a query including aggregation processing in a sub-query as shown in FIG. 3, a query for performing hash join, a query including a set operation such as UNION, and a query including a sub-query related to an EXISTS phrase. In (S6) of the query block 2, the DBMS executes processing referring to a result of (S3) of the query block 1. That is, in the query execution plan shown in FIG. 4, the DBMS can execute the query block 2 in parallel to the query block 1 until the DBMS refers to a result of the query block 1, that is, before (S6).

Figure 5:
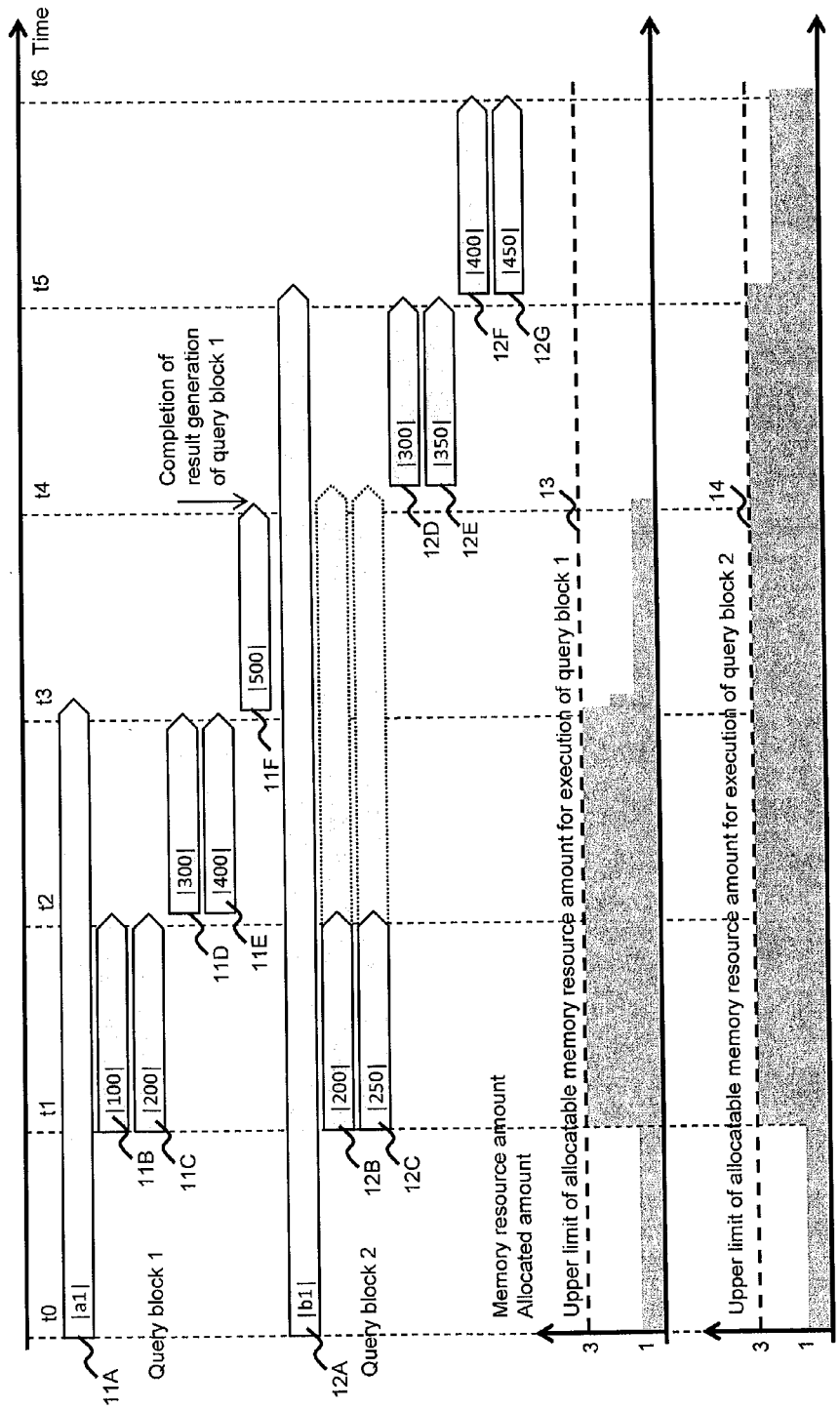
FIG. 5 is an example of a schematic diagram for explaining execution of tasks in the case in which upper limits of allocatable memory resource amounts for execution of two query blocks are set the same.

As described above, the DBMS executes the query according to the query execution plan. It is assumed that, when the DBMS executes the query in FIG. 3 according to the query execution plan in FIG. 4, a largest amount of memory resources that can be consumed for the execution (an allocatable memory resource amount) is limited. It is assumed that the DBMS equally allocates halves of the limited allocatable memory resource amount respectively to two query blocks that can be executed in parallel in the query execution plan in FIG. 4. That is, upper limits of allocatable memory resource amounts for the execution of the query blocks are set to the same amount. In this case, an example in which tasks are dynamically generated is shown in FIG. 5. FIG. 5 will be described below. Note that notation of FIG. 5 conforms to the following rules.

(*) The abscissa represents time.
(*) A laterally long pentagon in an upper part of the figure means a DB operation by one task. A left end of the pentagon represents time when a task is generated and a DB operation by the task is started. A right end of the pentagon represents time when the DB operation by the task ends and the task is ended.
(*) A value inside the pentagon in the upper part of the figure represents data fetched according to the DB operation corresponding to the task.
(*) An ordinate in a lower part of the figure represents an amount of memory resources (an amount of allocated memory resources) consumed in the execution of query blocks.
(*) It is assumed that an upper limit of a memory resource amount allocatable to the execution of the entire query in FIG. 3 is "6". It is assumed that upper limits of memory resource amounts allocatable to execution of the query block 1 and the query block 2 are respectively fixedly determined as the same amount "3" as indicated by broken lines 13 and 14.
(*) It is assumed that a memory resource amount necessary for a DB operation corresponding to one task is "1". Note that a memory resource amount required for generation of a task itself is managed separately from memory resources consumed for the execution of the task.

According to the technique of PTL 1, one or more tasks can be dynamically generated based on a result of a DB operation executed by a task. In the example in FIG. 5, a technique for performing determination processing of simultaneous-task-generation number every time the DBMS newly generates a task is further added to the technique of PTL 1. The determination processing of simultaneous-task-generation number is calculating, targeting each query block, the number of simultaneous task generation, which is the number of tasks that can be simultaneously generated in the execution of the query block, based on the number of generatable tasks, which is the number of tasks that can be newly generated, a first memory resource amount, which is a memory resource amount required to be allocated per task newly generated, and a second memory resource amount, which is the amount of memory resources that can be newly allocated to execution of the target query block. In this embodiment, the first memory resource amount is a memory resource amount based on a memory resource amount (DB operation memory resource amount) required for a DB operation corresponding to the task to be newly generated. For example, the first memory resource amount is an amount same as a DB operation memory resource amount or a memory resource amount larger than the DB operation memory resource amount or, if there is a reason that, for example, memory resources can be shared with other tasks, a memory resource amount smaller than the DB operation memory resource amount. The number of tasks dynamically simultaneously generated does not have to be the same number as the number of simultaneous task generation and may be the number smaller than the number of simultaneous task generation.

According to the example in FIG. 5, the DBMS executes the query in FIG. 3 according to the query execution plan in FIG. 4 as described below. (t0) (Query block 1) In generating a task for accessing the index A, the DBMS performs the determination processing of simultaneous-task-generation number. For example, the DBMS calculates the number of simultaneous task generation as "1" based on the number of generatable tasks "1", a first memory resource amount "1", and a second memory resource amount "3" (an upper limit "3" of a memory resource amount allocatable to the execution of the query block 1). The DBMS generates a task 11A in number same as the calculated number of simultaneous task generation "1". In task 11A, the DBMS performs a search for a RowID List of a record, a value of which in the column A_Type of the table A is "AAA". The DBMS allocates memory resources necessary for the execution of the task 11A and executes the task 11A.

(t0) (Query block 2) In generating a task for accessing the index B, the DBMS performs the determination processing of simultaneous-task-generation number. For example, the DBMS calculates the number of simultaneous task generation as "1" based on the number of generatable tasks "1", the first memory resource amount "1", and the second memory resource amount "3" (an upper limit "3" of a memory resource amount allocatable to the execution of the query block 2). The DBMS generates a task 12A in number same as the calculated number of simultaneous task generation "1". In task 12A, the DBMS performs a search for a RowID List of a record, a value of which in the column B_Type of the table B is "PPP". The DBMS allocates memory resources necessary for the execution of the task 12A and executes the task 12A.

(t1) (Query block 1) the DBMS obtains a RowID List "a1" according to the execution of the task 11A. The DBMS performs the determination processing of simultaneous-task-generation number based on a result of the execution in generating five tasks for respectively fetching data including the five records (the first record, the third record, the sixth record, the seventh record, and the ninth record) of the table A. For example, the DBMS calculates the number of simultaneous task generation as "2" based on the number of generatable tasks "5", the first memory resource amount "1", and the second memory resource amount "2" (a value obtained by subtracting the allocated memory resource amount "1" from the upper limit "3" of the memory resource amount allocatable to the execution of the query block 1). The DBMS generates tasks 11B and 11C in number same as the calculated number of simultaneous task generation "2". In the task 11B, the DBMS fetches data including the first record of the table A. In the task 11C, the DBMS fetches data including the third record of the table A. The DBMS allocates memory resources respectively necessary for execution of the tasks 11B and 11C and executes the tasks 11B and 11C. Concerning the task 11A, there are three remaining tasks that can be newly generated based on a result of the execution. Therefore, the DBMS holds off generation of a task by the task 11A until generation of a new task becomes possible.

(t1) (Query block 2) The DBMS obtains a RowID List "b1" according to the execution of the task 12A. The DBMS performs the determination processing of simultaneous-task-generation number based on a result of the execution in generating six tasks for respectively fetching data including six records (a first record, a fifth record, a sixth record, a ninth record, an eleventh record, and a fourteenth record) of the table B. For example, the DBMS calculates the number of simultaneous task generation as "2" based on the number of generatable tasks "6", the first memory resource amount "1", and the second memory resource amount "2" (a value obtained by subtracting the allocated memory resource amount "1" from the upper limit "3" of the memory resource amount allocatable to the execution of the query block 2). The DBMS generates tasks 12B and 12C in number same as the calculated number of simultaneous task generation. In the task 12B, the DBMS fetches data including the first record of the table B. In the task 12C, the DBMS fetches data including the fifth record of the table B. The DBMS allocates memory resources respectively necessary for execution of the tasks 12B and 12C and executes the tasks 12B and 12C. Concerning the task 12A, there are four remaining tasks that can be newly generated based on a result of the execution. Therefore, the DBMS holds off generation of a task by the task 12A until generation of a new task becomes possible.

(t2) (Query block 1) According to the execution of the tasks 11B and 11C, the DBMS extracts values of the AC1 respectively from the corresponding records of the table A. The DBMS tabulates the extracted values of the AC1 and ends the execution of the tasks. Concerning the respective tasks 11B and 11C, the execution of which is ended, the DBMS releases the allocated memory resources and ends the tasks 11B and 11C (immediately after t2). Consequently, since the second memory resource amount related to the execution of the query block 1 changes to "2", the DBMS performs the determination processing of simultaneous-task-generation number concerning the task 11A that waits for generation of a task. The DBMS calculates the number of simultaneous task generation as "2" according to the processing and generates tasks 11D and 11E in number same as the calculated number. In the task 11D, the DBMS fetches data including the sixth record of the table A. In the task 11E, the DBMS fetches data including the seventh record of the table A. The DBMS allocates memory resources respectively necessary for execution of the tasks 11D and 11E and executes the tasks 11D and 11E. Concerning the task 11A, there is the remaining one task that can be newly generated based on a result of the execution. Therefore, the DBMS holds off generation of a task by the task 11A until generation of a new task becomes possible.

(t2) According to the execution of the tasks 12B and 12C, the DBMS extracts values of the BC1 respectively from the corresponding records of the table B. The DBMS needs to refer to and compare a result (an average) of the query block 1 concerning the respective values of the BC1 extracted by the task. However, since the execution of the query block 1 is not completed, the DBMS cannot perform the comparison processing described above. Therefore, concerning the tasks 12B and 12C, the DBMS holds off the execution of the tasks until the execution of the query block 1 is completed while keeping the memory resources, in which the extracted values of the BC1 are stored, allocated.

(t3) (Query block 1) According to the execution of the tasks 11D and 11E, the DBMS extracts values of the AC1 respectively from the corresponding records of the table A. The DBMS tabulates the extracted values of the AC1 and ends the execution of the tasks. Concerning the respective tasks 11D and 11E, the execution of which is ended, the DBMS releases the allocated memory resources and ends the tasks 11D and 11E (immediately after t3). Consequently, since the second memory resource amount related to the execution of the query block 1 changes to "2", the DBMS performs the determination processing of simultaneous-task-generation number concerning the task 11A that waits for generation of a task. The DBMS calculates the number of simultaneous task generation as "1" according to the processing and generates task 11F in number same as the calculated number. The DBMS allocates memory resources necessary for execution to the task 11F for fetching data including the ninth record of the table A and executes the task 11F. Concerning the task 11A, all of the five tasks generatable based on the execution result thereof are generated and execution of the tasks is started. Therefore, the DBMS releases the memory resources allocated to the task 11A and ends the task 11A.

(t3) (Query block 2) Concerning the tasks 12B and 12C, as at t2, since the DBMS cannot obtain a result of the query block 1, the DBMS holds off execution of the tasks.

(t4) (Query block 1) According to the execution of the task 11F, the DBMS extracts and tabulates values of the corresponding record AC1 of the table A to obtain an average "300" of the AC1, which is a result of the query block 1 (immediately after t4). The DBMS ends the execution of the task. The DBMS releases the memory resources allocated to the task 11F and ends the task.

(Immediately after t4) (Query block 2) Concerning the tasks 12B and 12C, the DBMS determines whether the respective values of the BC1 extracted by the tasks are larger than the result (the average) of the query block 1 obtained as described above. The DBMS determines that the respective values are not larger than the result and ends the execution of the tasks 12B and 12C. Concerning the respective tasks 12B and 12C, the execution of which is ended, the DBMS releases the allocated memories and ends the tasks. Consequently, since the second memory resource amount related to the execution of the query block 2 changes to "2", the DBMS performs the determination processing of simultaneous-task-generation number concerning the task 12A that waits for generation of a task. The DBMS calculates the number of simultaneous task generation as "2" according to the processing and generates tasks 12D and 12E in number same as the calculated number. In the task 12D, the DBMS fetches data including the sixth record of the table B. In the task 12E, the DBMS fetches data including the ninth record of the table B. The DBMS allocates memory resources respectively necessary for execution of the tasks 12D and 12E and executes the tasks. Concerning the task 12A, there are the remaining two tasks that can be newly generated based on a result of the execution. Therefore, the DBMS holds of f generation of a task by the task 12A until generation of a new task becomes possible.

(t5) (Query block 2) According to the execution of the tasks 12D and 12E, the DBMS extracts values of the BC1 respectively from the corresponding records of the table B and determines whether the extracted values are larger than the result of the query block 1. Concerning the task 12D, the DBMS determines that the value is not larger than the result of the query block 1 and ends the execution of the task 12D. Concerning the task 12E, the DBMS determines that the value is larger than the result and returns the value to a query issue source as a result of the query. The DBMS ends the execution of the task 12E. Concerning the respective tasks 12D and 12E, the execution of which is ended, the DBMS releases the allocated memory resources and ends the tasks (immediately after t5). Consequently, since the second memory resource amount related to the execution of the query block 2 changes to "2", the DBMS performs the determination processing of simultaneous-task-generation number concerning the task 12A that waits for generation of a task. The DBMS calculates the number of simultaneous task generation as "2" according to the processing and generates tasks 12F and 12G in number same as the calculated number. In the task 12F, the DBMS fetches data including the eleventh record of the table B. In the task 12G, the DBMS fetches data including the fourteenth record of the table B. The DBMS allocates memory resources respectively necessary for execution of the tasks 12F and 12G and executes the tasks. Concerning the task 12A, all of the generable six tasks are generated and execution of the tasks is started based on a result of the execution. Therefore, the DBMS releases the memory resources allocated to the task 12A and ends the task 12A.

(t6) (Query block 2) According to the execution of the tasks 12F and 12G, the DBMS extracts values of the BC1 respectively from the corresponding records of the table B and determines whether the extracted values are larger than the result of the query block 1. Concerning the two tasks, the DBMS determines that the values are larger than the result and returns the values to the query issue source as a result of the query. The DBMS ends the execution of the two tasks. Concerning the respective tasks 12F and 12G, the execution of which is ended, the DBMS releases the allocated memory resources and ends the tasks.

In this way, in the example in FIG. 5, every time the DBMS newly generates a task, the DBMS determines the number of simultaneous task generation according to the determination processing of simultaneous-task-generation number targeting respective query blocks. The DBMS sets a total number of tasks dynamically generated based on an execution result of a DB operation corresponding to the task to a number equal to or smaller than the number of simultaneous task generation. Consequently, amounts of memory resources consumed by the execution of the query blocks respectively do not exceed a fixed upper limit "3" of a memory resource amount allocatable to execution of the query blocks. Therefore, an amount of memory resources consumed by the entire query execution does not exceed an upper limit "6" of a limited allocatable memory resource amount. Therefore, it is possible to prevent memory resources consumed by the execution of the query from being exhausted. Note that "the simultaneous task generation" means task generation in substantially the same periods of time based on a result of a certain DB operation.

However, in the example shown in FIG. 5 described above, concerning the tasks 12B and 12C of the query block 2 that refers to the execution result of the query block 1, the DBMS holds off the generation of the tasks while keeping the allocated memory resources secured until the execution of the query block 1 ends (until t4). Therefore, the limited memory resources cannot be effectively used. As a result, there is a problem in that task execution multiplicity of the entire task execution, that is, multiplicity of a data read request decreases and a query execution time increases.

Therefore, in Embodiment 1, the DBMS dynamically changes, for each of the query blocks, the upper limit of the allocatable memory resource amount at the start of the execution of the query and after the start of the execution of the query. Consequently, effective use of the memory resources is attained.

Figure 6:
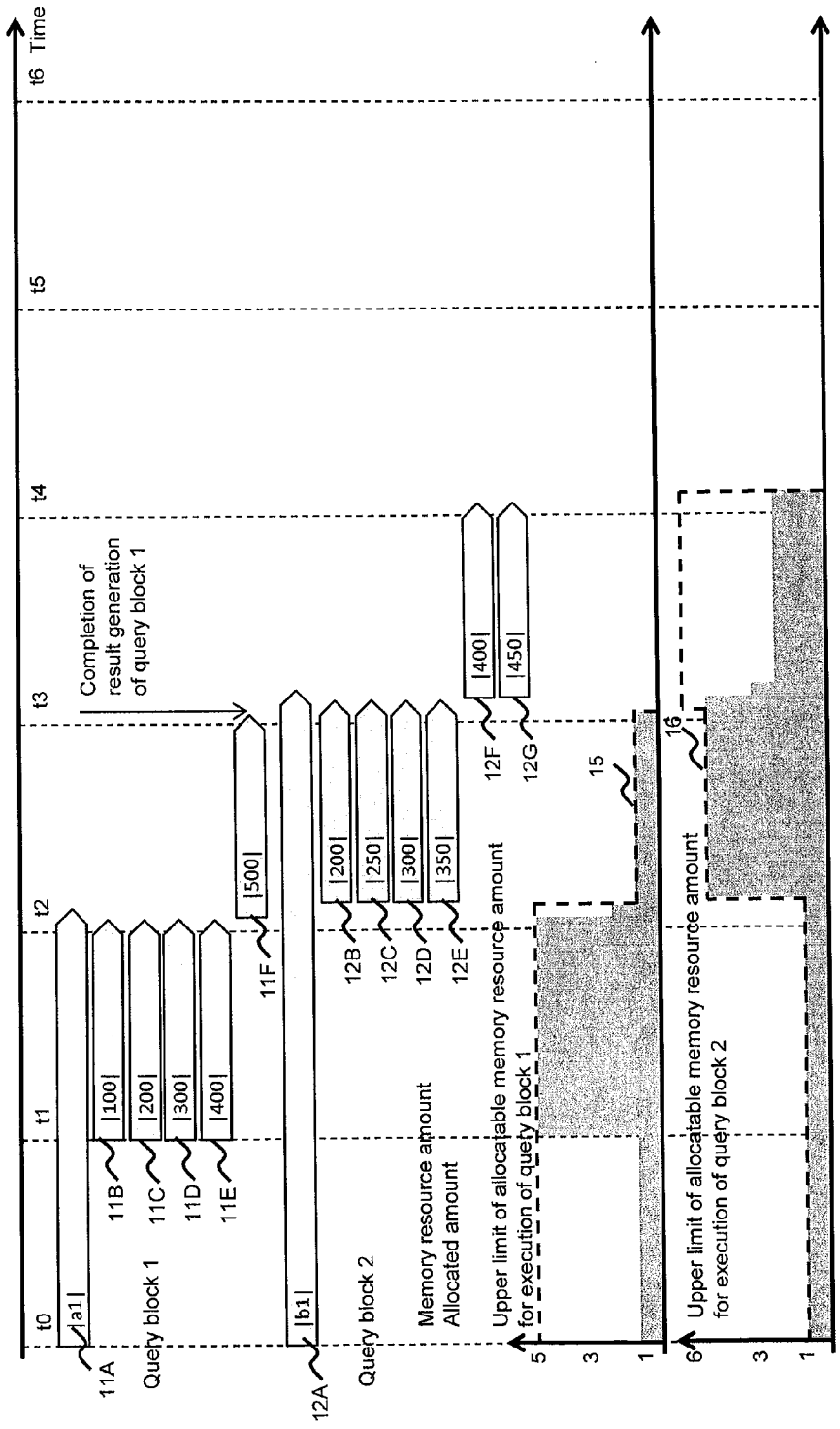
FIG. 6 is an example of a schematic diagram for explaining execution of tasks in the case in which the upper limits of the memory resource amounts for execution of the two query blocks are changed in Embodiment 1.

FIG. 6 shows an example of a schematic diagram indicating that memory resources can be effectively used when the DBMS executes the query in FIG. 3 according to the query execution plan in FIG. 4 in Embodiment 1. Rules of notation are the same as the rules shown in FIG. 5. Note that, in FIG. 6, it is assumed that upper limits of memory resource amounts respectively allocatable to execution of the query block 1 and the query block 2 are not fixedly determined. In the example in FIG. 6, the DBMS executes the query as described below.

(Immediately before t0) In starting execution of a query, the DBMS determines an upper limit of a memory resource amount allocatable to the entire execution of the query. The DBMS determines the upper limit of the memory resource amount as "6" based on, for example, attributes of an AP (Application Program) of a query issue source (same as FIG. 5). Subsequently, the DBMS determines, based on a reference relation among query blocks or the like, a ratio for distributing the determined memory resource amount allocatable to the entire query execution to execution of each of the query blocks. Examples of the reference relation among the query blocks include a relation between the number of DB operations (or data read requests) until reference to a result of the query block 1 and a total number of DB operations in the query block 2 of the query execution plan in FIG. 4. Specifically, the reference relation is a relation that, in the query block 2 in FIG. 4, the number of DB operations (or data read requests) until reference to a result of the query block 1 is small with respect to the total number of DB operations (or data read requests) of the query block 2. Therefore, the DBMS determines the ratio for distributing the memory resources respectively to the execution of the query block 1 and the execution of the query block 2 as 5:1. The DBMS sets an upper limit of memory resources allocatable to the execution of the query block 1 to "5" and sets an upper limit of a memory resource amount allocatable to the execution of the query block 2 to "1" based on the ratio (broken lines 15 and 16 at t0).

(t0) (Query block 1) In generating a task for accessing the index A, the DBMS performs the determination processing of simultaneous-task-generation number. For example, the DBMS calculates the number of simultaneous task generation as "1" based on the number of generatable tasks "1", the first memory resource amount "1", and the second memory resource amount "5" (the upper limit "5" of the memory resources allocatable to the execution of the query block 1). The DBMS generates the task 11A in number same as the calculated number of simultaneous task generation "1". The DBMS allocates memory resources necessary for the execution of the corresponding DB operation and executes the task 11A.

(t0) (Query block 2) In generating a task for accessing the index B, the DBMS performs the determination processing of simultaneous-task-generation number. For example, the DBMS calculates the number of simultaneous task generation as "1" based on the number of generatable tasks "1", the first memory resource amount "1", and the second memory resource amount "1" (the upper limit "1" of the memory resources allocatable to the execution of the query block 2). The DBMS generates the task 12A in number same as the calculated number of simultaneous task generation "1". The DBMS allocates memory resources necessary for the execution of the corresponding DB operation and executes the task 12A.

(t1) (Query block 1) The DBMS performs the determination processing of simultaneous-task-generation number based on a result of the execution of the task 11A in generating five tasks for respectively fetching data including the five records of the table A. For example, the DBMS calculates the number of simultaneous task generation as "4" based on the number of generatable tasks "5", the first memory resource amount "1", and the second memory resource amount "4" (a value obtained by subtracting the allocated memory resource amount "1" from the upper limit "5" of the memory resource amount allocatable to the execution of the query block 1). The DBMS generates tasks (11B, 11C, 11D, and 11E) in number same as the calculated number of simultaneous task generation "4". The DBMS allocates required memory resources respectively to the corresponding DB operations and executes the tasks. Concerning the task 11A, there is one remaining task that can be newly generated based on a result of the execution. Therefore, the DBMS holds off generation of a task by the task 11A until generation of a new task becomes possible.

(t1) (Query block 2) The DBMS performs the determination processing of simultaneous-task-generation number based on a result of the execution of the task 12A in generating six tasks for respectively fetching data including the six records of the table B. For example, the DBMS calculates the number of simultaneous task generation as "0" based on the number of generatable tasks "6", the first memory resource amount "1", and the second memory resource amount "0" (a value obtained by subtracting the allocated memory resource amount "1" from the upper limit "1" of the memory resource amount allocatable to the execution of the query block 2). The DBMS does not generate a new task based on the calculated result. Concerning the task 12A, the DBMS holds off generation of a task by the task 12A until generation of a new task becomes possible.

(t2) (Query block 1) The DBMS ends the execution of the tasks 11B, 11C, 11D, and 11E and releases the memory resources allocated to the tasks and ends the task (immediately after t2). Consequently, since the second memory resource amount related to the execution of the query block 1 changes to "4", the DBMS performs the determination processing of simultaneous-task-generation number concerning the task 11A that waits for generation of a task. The DBMS calculates the number of simultaneous task generation as "1" according to the processing, generates the tasks 11F in number same as the calculated number, allocates necessary memory resources to the task 11F, and executes the task 11F. Concerning the task 11A, since all of the five tasks generatable based on the execution result thereof are generated and execution of the tasks is started. Therefore, the DBMS releases the memory resources allocated to the task 11A and ends the task 11A.

(Immediately after t2) The DBMS determines a memory resource amount distributed to execution of the query blocks according to, for example, an execution progress status of each of the query blocks. Examples of the execution progress status of the query block include the number of tasks that waits for generation of a task. Immediately after t2, since the number of tasks that waits for generation of a task in the query block 1 is zero, for example, the DBMS reduces the upper limit of the memory resource amount allocatable to the query block 1 from "5" to "1" and increases the upper limit of the memory resource amount allocatable to the query block 2 from "1" to "5".

(Immediately after t2) (Query block 2) Since the second memory resource amount related to the query block 2 changes to "4" (a value obtained by subtracting the allocated memory resource amount "1" from the upper limit "5" of the memory resource amount allocatable to the execution of the query block 2), the DBMS performs the determination processing of simultaneous-task-generation number concerning the task 12A that waits for generation of a task. The DBMS calculates the number of simultaneous task generation as "4" according to the processing, generates tasks (12B, 12C, 12D, and 12E) in number same as the calculated number, allocates necessary memory resources respectively to the tasks, and executes the tasks. Concerning the task 12A, there are the remaining two tasks that can be newly generated based on a result of the execution. Therefore, the DBMS holds off generation of a task by the task 12A until generation of a new task becomes possible.

(t3) (Query block 1) According to the execution of the task 11F, the DBMS generates a result of the query block 1 and ends the execution of the task 11F (immediately after t3). The DBMS releases the memory resources allocated to the task 11F and ends the task.

(Immediately after t3) For example, since the number of tasks that execute the query block 1, which is an execution progress status of the query block, is zero, the DBMS reduces the upper limit of the memory resource amount allocatable to the query block 1 from "1" to "0" and increases the upper limit of the memory resource amount allocatable to the query block 2 from "5" to "6".

(Immediately after t3) (Query block 2) Concerning the tasks 12B, 12C, 12D, and 12E, the DBMS refers to the result of the query block 1, generates a result of the query, and ends the execution of the task. Concerning the four tasks, the execution of which is ended, the DBMS releases the allocated memory resources and ends the tasks. Since the second memory resource amount related to the query block 2 changes to "5" (a value obtained by subtracting the allocated memory resource amount "1" from the upper limit "6" of the memory resource amount allocatable to the execution of the query block 2), the DBMS performs the determination processing of simultaneous-task-generation number concerning the task 12A that waits for generation of a task. The DBMS calculates the number of simultaneous task generation as "2" according to the processing, generates the tasks 12F and 12G in number same as the calculated number, allocates necessary memory resources to the tasks 12F and 12G, and executes the tasks 12F and 12G. Concerning the task 12A, all of the generable six tasks are generated and execution of the tasks is started based on a result of the execution. Therefore, the DBMS releases the memory resources allocated to the task 12A and ends the task 12A.

(t4) Concerning the tasks 12F and 12G, the DBMS refers to the result of the query block 1, generates a result of the query, and ends the execution of the tasks. Concerning the tasks 12F and 12G, the DBMS releases the allocated resources and ends the tasks.

In this way, in Embodiment 1, it is possible to minimize the number of tasks having the result of the query block 1 and maximize task execution multiplicity effectively utilizing limited memory resources. As a result, it is possible to change time for ending the execution of the query from t6 in the example in FIG. 5 to t4 in Embodiment 1 and reduce a query execution time. In summary, in Embodiment 1, in executing a new query or according to a situation in which a query block is executed, the DBMS dynamically changes upper limits of memory resource amounts allocatable to execution of query blocks. Consequently, in an environment in which there is limitation on an allocatable memory resource amount, it is possible to allocate memory resources to appropriate execution of a query block at appropriate timing within a range of the limitation. As a result, concerning a query to be generated as a query execution plan including a plurality of query blocks, it is possible to expect an effect that execution multiplicity of a task, that is, multiplicity of a data read request is improved over entire execution of the query. Therefore, it is possible to expect a reduction in a query execution time.

Note that, in this embodiment, when the number of tasks usable for execution of a query is limited because of, for example, limitation on an amount of memory resources required for generation of a task itself, in addition to dynamically changing the upper limits of the memory resource amounts allocatable to the execution of the query blocks, an upper limit of the number of tasks capable of executing corresponding query blocks may be dynamically determined. That is, in FIG. 6, in addition to the variation of the broken lines 15 and 16, which are the upper limits of the memory resource amounts allocatable to the execution of the query blocks, the upper limit of the number of tasks capable of executing the query blocks may be varied.

Note that an upper limit of a memory resource amount allocatable to execution of each query may change, for example, (1) or (2) described below as an opportunity:
(1) a total number of simultaneously executed queries changes; and
(2) priority of at least one query changes.

FIG. 5 and FIG. 6 are schematic diagrams showing schematic images. The DBMS does not have to start a plurality of tasks at the same point in time.

The Embodiment 1 will be described in detail below.

Figure 7:
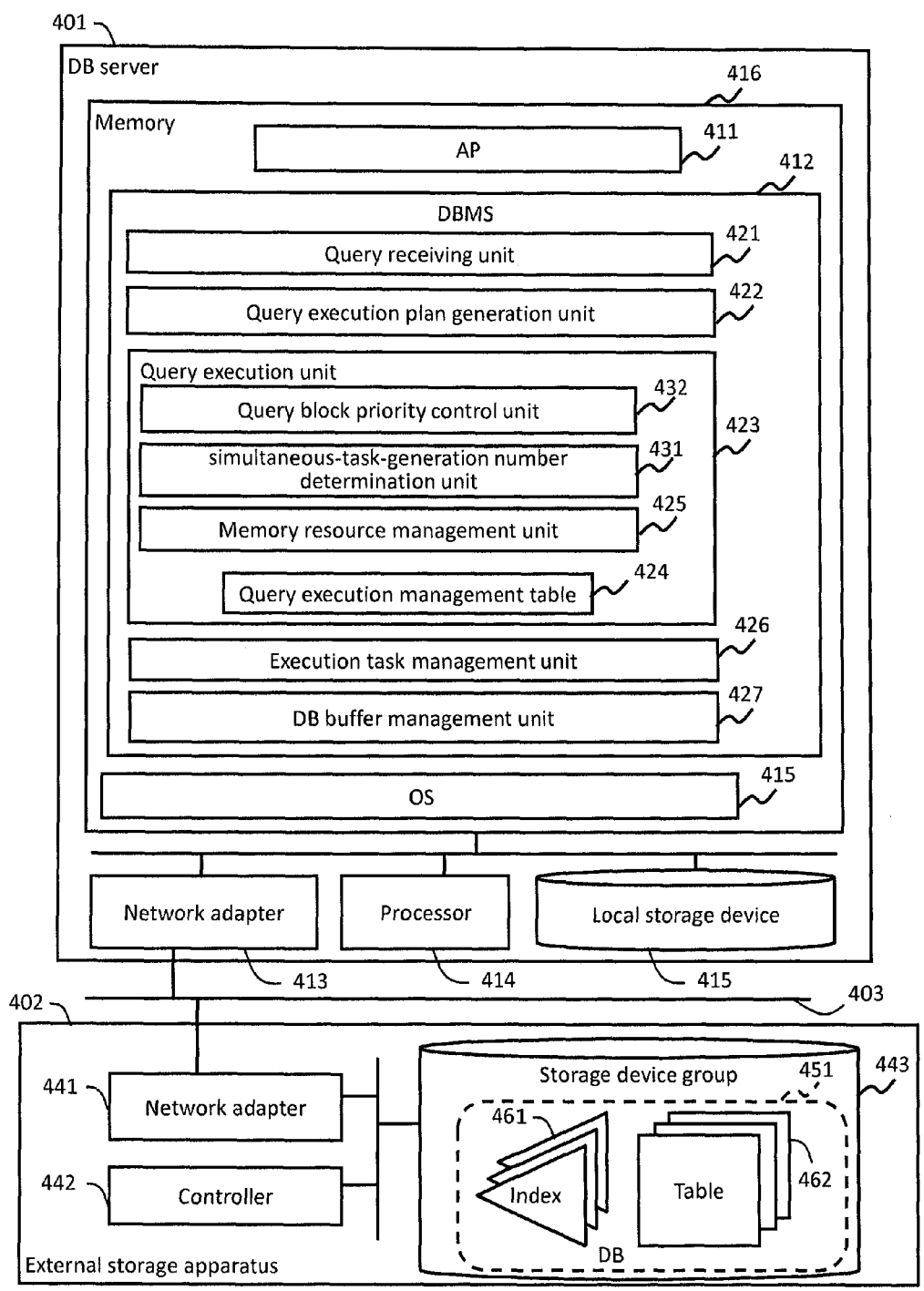
FIG. 7 shows the configuration of a computer system according to Embodiment 1.

FIG. 7 shows the configuration of a computer system according to Embodiment 1.

A DB server 401 is coupled to an external storage apparatus 402 via a communication network 403. As a protocol of communication via the communication network 403, for example, an FC (Fibre Channel), an SCSI (Small Computer System Interface), or a TCP/IP (Transmission Control Protocol/Internet Protocol) may be adopted.

The DB server 401 is a computer, for example, a personal computer, a work station, or a main frame or a virtual computer (a virtual machine) configured by any one of these. The DB server 401 includes a network adapter 413, a memory 416, a local storage device 415, and a processor (typically, a microprocessor) 414 connected thereto. The processor 414 executes computer programs, for example, an OS (Operating System) 415, a DBMS 412, and an AP (Application Program) 411 for issuing a query to the DBMS 412. The memory 416 temporarily stores a program executed by the processor 414 and data used by the program. The local storage device 415 stores the program and the data used by the program. The network adapter 413 connects the communication network 403 and the DB server 401. The AP 411 may operate on not-shown another computer coupled to the communication network 403 rather than on the DB server 401. The processor 414 may be an element included in a control device coupled to the network adapter 413, the memory 416, and the like. The control device may include, other than the processor 414, a dedicated hardware circuit (e.g., a circuit that performs encryption and/or decryption of data).

Note that, from viewpoints of performance and redundancy, the DB server 401 may include a plurality of at least one elements among the processor 414, the memory 416, the local storage device 415, and the network adapter 413. The DB server 401 may include an input device (e.g., a keyboard and a pointing device) and a display device (e.g., a liquid crystal display) not shown in the figure. The input device and the display device may be integrated.

In the DB server 401, the DBMS 412 executes a query issued from the AP 411. In executing the query, the DBMS 412 issues an I/O request for a DB 451 stored in the external storage apparatus 402 to the OS 415. The OS 415 transmits the I/O request issued from the DBMS 412 to the external storage apparatus 402.

In this embodiment, the external storage apparatus 402 is a device including a plurality of storage devices 443 like a disk array device. Instead of the device, the external storage apparatus 402 may be a single storage device. The external storage apparatus 402 stores data and a program used by the DB server 401. The external storage apparatus 402 receives an I/O request from the DB server 401, executes processing corresponding to the I/O request, and transmits a processing result to the DB server 401.

The external storage apparatus 402 includes a network adapter 441, a storage device group 443, and a controller 442 connected thereto.

The network adapter 441 connects the external storage apparatus 402 to the communication network 403.

The storage device group 443 includes one or more storage devices. The storage device is a nonvolatile storage medium, for example, a magnetic disk, a flash memory, or other semiconductor memories. The storage device group 443 may be a group that stores data at a predetermined RAID level according to a RAID (Redundant ARRAY of Independent Disks). A logical storage device (a logical volume) may be provided to the DB server 401 based on a storage space of the storage device group 443. The storage device group 443 stores the DB 451.

The controller 442 includes, for example, a memory and a processor. The controller 442 inputs data to and outputs data from the storage device group 443, which stores the DB 451, according to an I/O request from the DB server 401. For example, the controller 442 stores, in the storage device group 443, writing target data conforming to a writing request from the DB sever 401. The controller 442 reads out, from the storage device group 443, read target data conforming to a read request from the DB sever 401 and transmits the data to the DB server 401.

Note that, from viewpoints of performance and securing of redundancy, the external storage apparatus 402 may include a plurality of elements such as the controllers 442.

The DBMS 412 manages the DB 451 including business data. The DB 451 includes one or more tables 462 and indexes 461. The table is a set of one or more records. The record is configured from one or more columns. The index is a data structure created targeting one or more columns in the table and increases speed of access to the table according to a selection condition including the column targeted by the index. For example, the index is a data structure that retains information (RowID) for specifying, for each value of the target column, a record in the table including the value. A B-tree structure or the like is used. Configuration examples of the table and the index of the DB are as shown in FIG. 1 and FIG. 2.

The DBMS 412 includes a query receiving unit 421, a query execution plan generation unit 422, a query execution unit 423, an execution task management unit 426, and a DB buffer management unit 427.

The query receiving unit 421 receives a query issued by the AP 421. The query is described in, for example, an SQL (Structured Query Language).

The query execution plan generation unit 422 generates, concerning the query received by the query receiving unit 421, a query execution plan including information representing one or more DB operations necessary for executing the query. The query execution plan is, for example, information in which an execution order of the DB operations, which should be performed in execution of the query, is defined by a tree structure. The query execution plan is stored in the memory 416. The query execution plan may include, for each of the DB operations, information representing an amount of memory resources required in execution by a task. For example, in the case of a query execution plan including information representing a DB operation for reading out a record of a certain table, the query execution plan may include information concerning a memory resource amount for storing the record of the table in the memory 416. An example of the query execution plan is as shown in FIG. 4.

The execution task management unit 426 manages a task for executing the query. For example, the execution task management unit 426 manages memory resources for generating a task and, according to a generation request for a task from the query execution unit 423, secures memory resources required for the task itself and generates the task. The execution task management unit 426 releases the memory resources required for the task itself and ends the task according to an end request for the task from the query execution unit 423. As the task, any module can be adopted. For example, the task may be a process or a thread managed by the OS 415 or may be a pseudo process or a pseudo thread implemented by the DBMS 412.

The DB buffer management unit 427 manages a storage area (a DB buffer) for temporarily storing data in the DB 451. The DB buffer is built on the memory 416. The DB buffer may be built on the local storage device 415.

The query execution unit 423 dynamically generates and executes, according to the query execution plan generated by the query execution plan generation unit 422, tasks for executing a DB operation, which is information included in the query execution plan. The query execution unit 423 returns an executed result to a query issue source. For example, the query execution unit 423 (a) requests the execution task management unit 426 to generate a task for executing the DB operation, (b) executes the generated task to read data necessary for the DB operation corresponding to the task (issue a read request to the external storage apparatus 402 including the DB 451 via the OS 415), (c) when a (N+1)th DB operation is executed based on an execution result of an N-th DB operation corresponding to the task executed in (b), requests the execution task management unit 426 to generate a task based on a result of the execution anew (N is an integer equal to or larger than 1), and (d) performs (b) and (c) concerning the task newly generated. When two or more executable tasks are present in (b) and (d), the query execution unit 423 executes at least two tasks among the two or more tasks in parallel.

The query execution unit 423 includes a simultaneous-task-generation number determination unit 431 that determines the number of simultaneous task generation, which is the number of tasks simultaneously generatable when a task is newly generated, a memory resource management unit 425 that manages memory resources allocatable to execution of a query, a query execution management table 424 including information concerning the execution of the query, a query block priority control unit 432 that determines priority concerning execution of each query block. The query block will be described below with reference to FIG. 8.

Kinds of processing of the query receiving unit 421, the query execution plan generation unit 422, the execution task management unit 426, the DB buffer management unit 427, and the query execution unit 423 (the simultaneous-task-generation number determination unit 431, the memory resource management unit 425, and the query block priority control unit 432) is realized by the processor 414 executing the DBMS 412. Among the kinds of processing, at least a part of the processing concerning at least one processing unit may be performed by hardware. In the description of this embodiment, when a processing unit is a subject, this means that, actually, the processing unit is executed by the processor 414. When at least a part of the processing unit is realized by hardware, in addition to the processor 414, the hardware can be a subject. Computer programs such as the DBMS 412 may be installed in, for example, the DB server 401 from a program source. The program source may be, for example, a storage medium readable by the DB server 401.

The configuration of the DBMS 412 shown in FIG. 7 is an example. For example, a certain processing unit may be divided into a plurality of processing units or one processing unit in which functions of a plurality of processing units are integrated may be built.

FIG. 8 shows the configuration of the query execution management table 424.

The query execution management table 424 includes, in units of a query block, information concerning execution of the query block. The "query block" is a set of one or more DB operations among DB operations, which are information included in a query execution plan. Examples of a query to be generated as a query execution plan including a plurality of query blocks include a query including aggregation processing in a sub-query as shown in FIG. 3, a query for performing hash join processing, a query including a set operation such as UNION, and a query including a sub-query related to an EXISTS phrase. Such a query execution plan sometimes includes a DB operation in which a certain query block refers to an execution result (e.g., a aggregation result concerning a sub-query) of another query block. That is, the query execution plan described above includes a query block (a referred query block) including one or more DB operations for generating a result to be referred to and a query block (a referring query block) including a DB operation for referring to a result of the referred query block. The referred query block and the referring query block are referred to as having a reference relation. As more specific example, in the case of the query including the aggregation processing in the sub-query as shown in FIG. 3, a query execution plan of the query includes, as shown in FIG. 4, two query blocks, that is, the query block 1 concerning the sub-query and the query block 2 concerning the remaining portion of the query (an outer side portion of the sub-query). The query execution unit 423 can execute a plurality of query blocks in the query execution plan in parallel. Note that a query including sub-queries having a correlation condition is not basically described in this embodiment and will be described in Embodiment 2 below.

The query execution management table 424 includes, as information concerning each query block, priority 901, a highest priority flag 902, a target execution time 903, execution start time 904, the number of execution tasks 905, the number of task generation-waiting tasks 906, the number of execution-waiting tasks 907, an execution achievement ratio 908, an allocated memory resource amount 909, and a reserved memory resource amount 910. Further, the query execution management table 424 includes, as information common to a plurality of query blocks, an unreserved memory resource amount 911 and an allocatable total memory resource amount 912. The respective kinds of information are as described below.

(*) The priority 901 represents priority for executing the query block. As a numerical value of the priority 901 is higher, the priority is higher. The priority may be determined by the query block priority control unit 432 or a user based on, for example, a reference relation among a plurality of query blocks in a query execution plan, an execution progress status of each of the query blocks, or a relation between a memory resource amount necessary for execution of each of the query blocks and an allocatable memory resource amount.

(*) The highest priority flag 902 is a flag indicating whether the query block is (ON), which is a query block to be most preferentially executed. This flag 902 may be designated by a query itself received by the DBMS 412, may be manually set by the user from the outer side of the DBMS 412 separately from the query, or may be set, when a query execution plan is generated by the query execution plan generation unit 422 on the inside of the DBMS 412, according to content of the query execution plan.

(*) The target execution time 903 indicates a target value of time required for execution of the query block. This target value may be designated by the user or may be determined by the DBMS 412 (e.g., the query execution plan generation unit 422). For example, in generating a query execution plan based on cost calculation, the query execution plan generation unit 422 may determine a predicted execution time based on the calculation as the target execution time 903.

(*) The execution start time 904 indicates time when execution of the query block is desired to be started.

(*) The number of execution tasks 905 indicates the number of tasks executed in the query block.

(*) The number of task generation-waiting tasks 906 indicates the number of tasks that wait for generation of a new task in the execution of the query block.

(*) The number of execution-waiting tasks 907 indicates the number of tasks waiting for the start of execution because execution of the referred query block having the reference relation is not completed in the query block.

(*) The execution achievement ratio 908 indicates to which degree in the entire query block the execution of the query block ends. That is, the execution achievement ratio 908 indicates progress of the execution of the query block. For example, the execution achievement ratio 908 may be a ratio of execution-completed I/Os (the number of completed DB operations) to a predicted total number of I/Os (a predicted number of DB operations) based on the cost calculation.

(*) The allocated memory resource amount 909 indicates allocated to the execution of the query block in the reserved memory resource amount 910 of the query block.

(*) The reserved memory resource amount 910 indicates a memory resource amount reserved for executing the query block.

(*) The unreserved memory resource amount 911 is a total amount of memory resources not reserved for execution of any query block in the allocatable total memory resource amount 912.

(*) The allocatable total memory resource amount 912 is a total amount of memory resources allocatable to execution of all the query blocks.

The memory resource management unit 425 manages the information 909 to 912 concerning memory resources used for the execution of the query. Before starting execution of at least one query block, the memory resource management unit 425 may register the allocatable total memory resource amount 912. Note that the query execution unit 423 may exclusively update the query execution management table 424.

Various kinds of processing performed in this embodiment will be described below with reference to FIG. 9 to FIG. 24.

Figure 9:
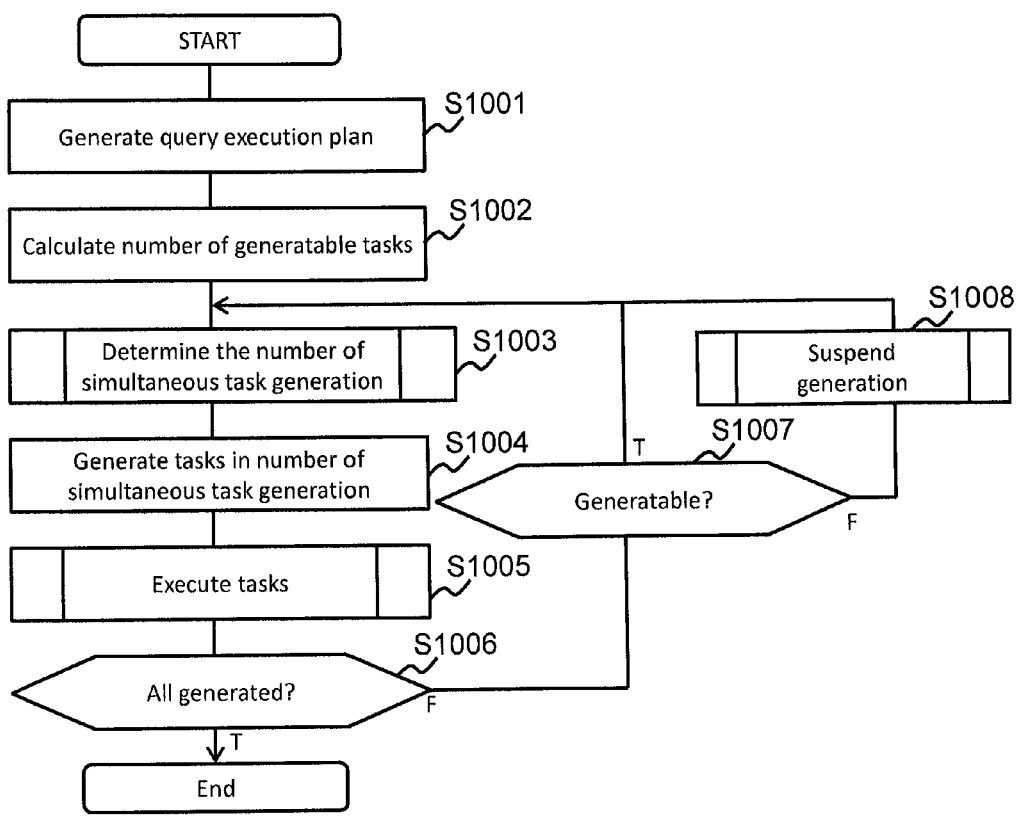
FIG. 9 shows a flow of entire query execution according to Embodiment 1.

FIG. 9 shows a flow of entire processing for generating and executing a task in execution of a query received by the DBMS 412. FIG. 9 shows a flow of execution of one query. Note that, when there are two or more simultaneously executed queries, the DBMS 412 may perform the processing shown in FIG. 9 in parallel for the two or more queries.

In S1001, the query execution plan generation unit 422 generates, based on statistical information of data of the DB 451 (hereinafter, "DB statistical information"), a query execution plan related to the query received by the query receiving unit 421. The query execution plan generation unit 422 may perform cost calculation for each of candidates of one or more query execution plans and select a candidate of one query execution plan among the candidates of the query execution plans as the query execution plan. The DB statistical information may include, for example, concerning the tables 462, information representing the number of records, information concerning a maximum and a minimum of data of each column, or statistical information such as a histogram representing a distributed status of the data of each column. The DB statistical information is stored in the local storage device 415 or the memory 416. The DB statistical information may be generated by the DBMS 412 checking the DB 451 or may be input from the outside of the DBMS 412. The query execution plan may be generated based on not only the DB statistical information but also description of the query. The query execution plan generation unit 422 may instruct the query execution unit 423 to register time when S1001 is performed in the query execution management table 424 as the execution start time 904 of a query block corresponding to the query. The query execution plan generation unit 422 may instruct, based on the query execution plan to be executed, the query execution unit 423 to register the priority 901, the highest priority flag 902, and the target execution time 903 of the query block corresponding to the query in the query execution management table 424. Note that the query execution unit 423 determines, concerning each of query blocks included in the generated query execution plan, the priority 901 corresponding thereto according to priority automatic change processing shown in FIG. 23 and registers the priority 901 in the query execution management table 424.

In S1002, the query execution unit 423 calculates, based on the query execution plan generated in S1001, the number of generatable tasks, which is the number of tasks that can be newly generated. For example, the query execution unit 423 discriminates, based on the query execution plan, the number of query blocks executable in parallel by a plurality of tasks and calculates the number of the discriminated query blocks as the number of generatable tasks.

Figure 14:
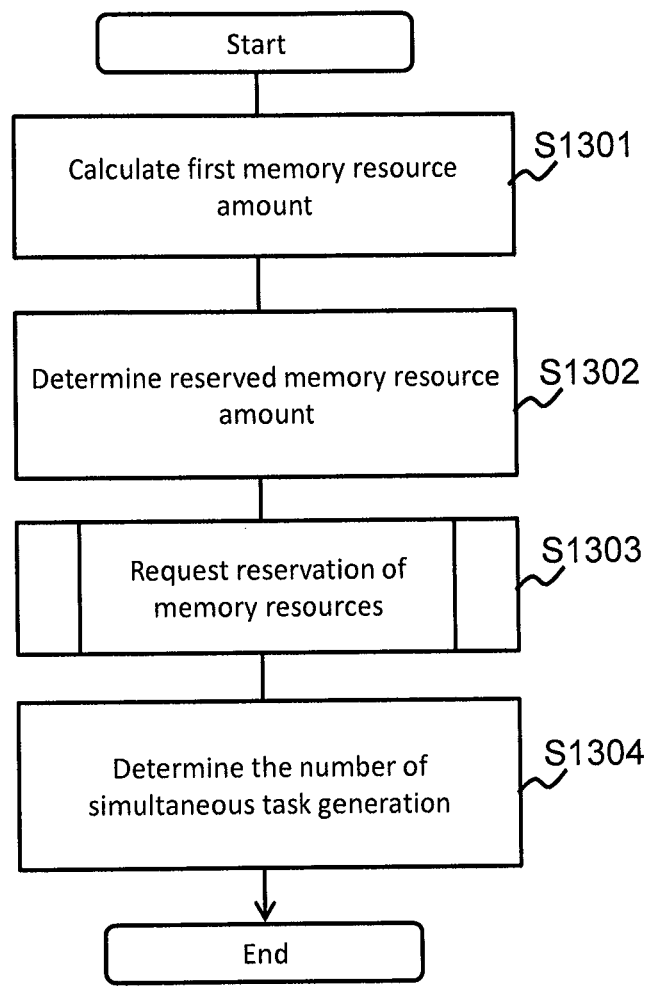
FIG. 14 shows a flow of determination processing of simultaneous-task-generation number according to Embodiment 1.

In S1003, the query execution unit 423 (the simultaneous-task-generation number determination unit 431) performs determination processing of simultaneous-task-generation number, which is processing for determining the number of simultaneous task generation. Details of the determination processing of simultaneous-task-generation number are as shown in FIG. 14. According to FIG. 14, the query execution unit 423 reserves, according to the determination processing of simultaneous-task-generation number, memory resources to be respectively allocated to tasks of the number of simultaneous task generation.

In S1004, the query execution unit 423 requests the execution task management unit 426 to generate tasks in number same as the number of simultaneous task generation determined in S1003. The execution task management unit 426 generates tasks in the requested number. Note that, when the number of generated tasks is smaller than the number of simultaneous task generation, the query execution unit 423 may cancel the reservation of the memory resources concerning an un-generated task in the number of simultaneously generated tasks among the memory resources reserved in S1003.

Figure 10:
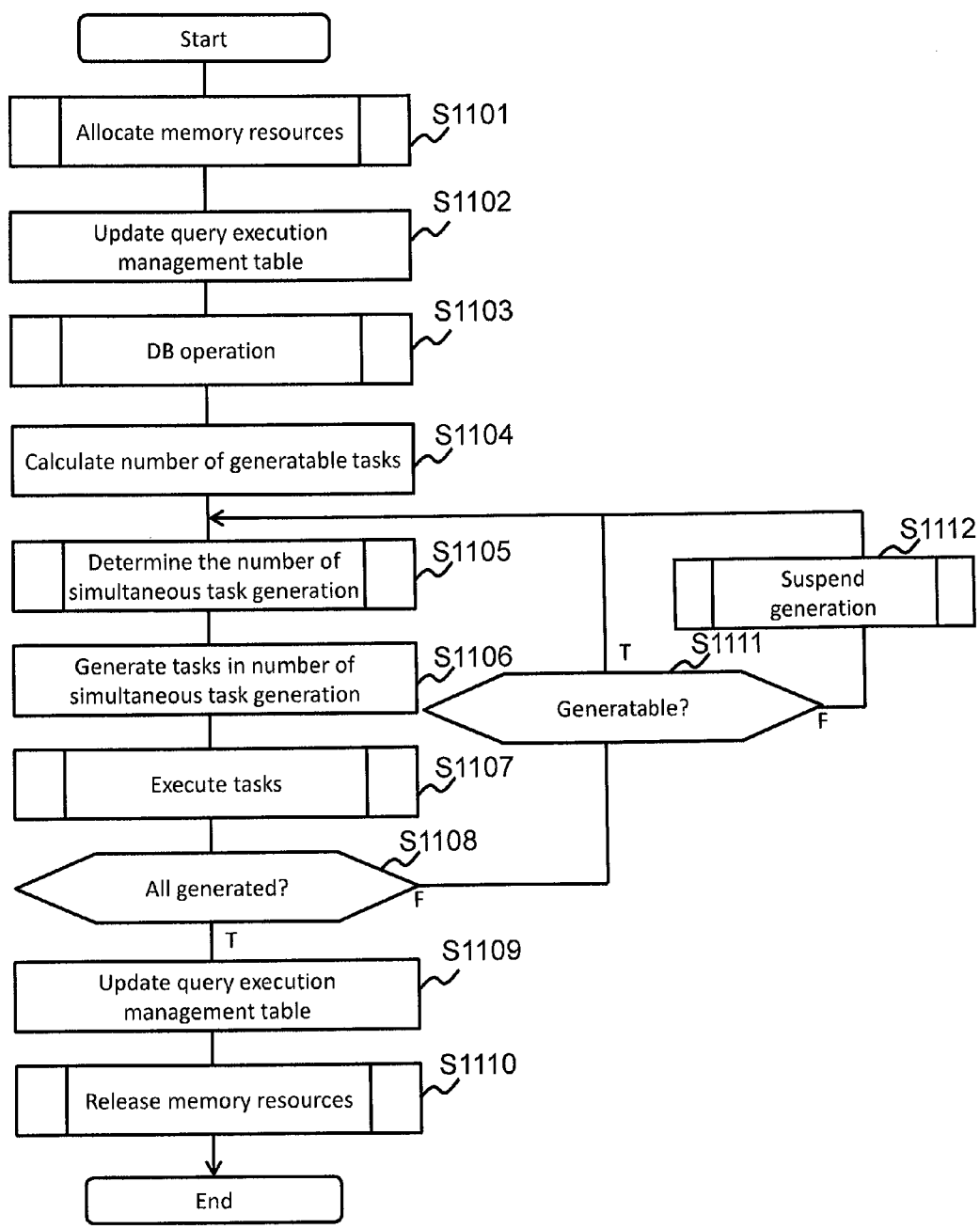
FIG. 10 shows a flow of task execution processing according to Embodiment 1.

In S1005, the query execution unit 423 performs, in parallel, processing for executing the respective tasks generated in S1004 (task execution processing). Details of the task execution processing to be executed are as shown in FIG. 10. Note that, when the number of simultaneous task generation determined in S1003 is zero, the query execution unit 423 performs nothing in steps S1004 and S1005.

In S1006, the query execution unit 423 determines whether all the tasks of the number of executable tasks calculated in S1002 are generated. If a result of the determination is affirmative, the query execution unit 423 ends the processing. If the result of the determination is negative, the query execution unit 423 performs S1007. Note that the query execution unit 423 generates the execution result of the query in extension of the processing of the task executed in S1005.

In S1007, the query execution unit 423 determines whether generation of a new task is possible. For example, the query execution unit 423 inquires the execution task management unit 426 whether generation of anew task is possible. The execution task management unit 426 answers the inquiry according to, for example, an allocation status of memory resources managed to generate a task. The query execution unit 423 determines, for example, referring to the query execution management table 424, whether the unreserved memory resource amount 911 is larger than a memory resource amount necessary for a DB operation corresponding to a new task. The query execution unit 423 determines, based on a result of the determination and the answer from the execution task management unit 426, whether generation of a new task is possible. If a result of the determination in S1007 is affirmative, the query execution unit 423 performs S1003 again. If the result of the determination in S1007 is negative, the query execution unit 423 performs S1008.

Figure 11:
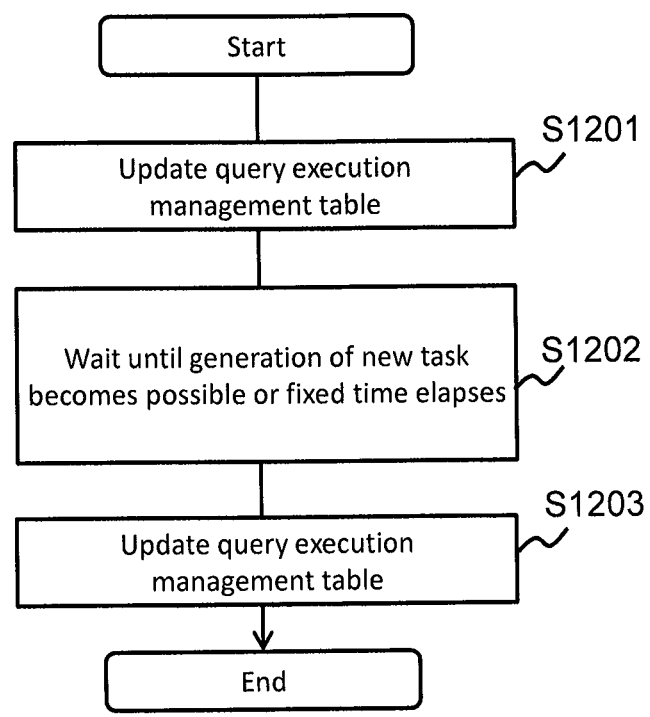
FIG. 11 shows a flow of task generation suspension processing according to Embodiment 1.

S1008, the query execution unit 423 performs task generation suspension processing. Details of the task generation suspension processing are as shown in FIG. 11.

FIG. 10 shows a flow of task execution processing (S1005 in FIG. 9 and S1107 in FIG. 10). FIG. 10 shows a flow for explaining one master task (referred to as "target master task" in the description of FIG. 10) as an example. In the description of FIG. 10, "master task" means any one task. A task generated based on the master task is referred to as "slave task". When another task is generated based on the slave task by the query execution unit 423, the slave task is equivalent to the master task and the generated other task is equivalent to the slave task. Note that, in the description of FIG. 10, a query block related to the target master task is referred to as "target query block".

Figure 15:
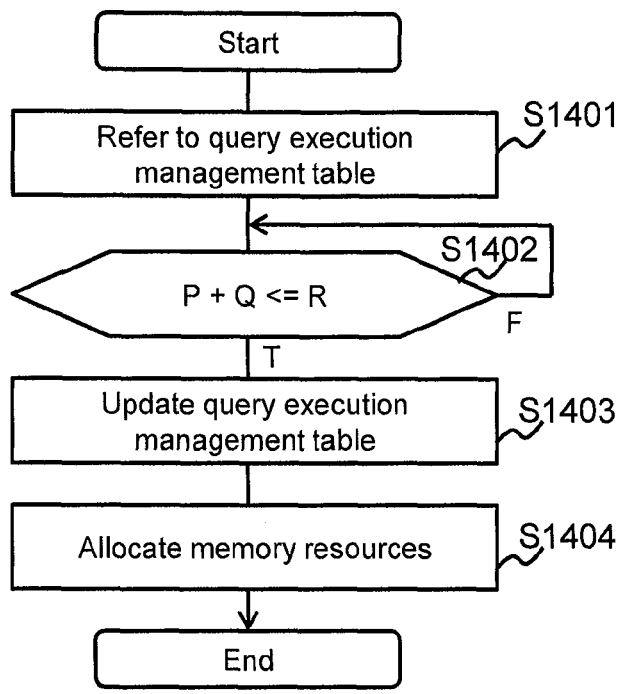
FIG. 15 shows a flow of memory resource allocation processing according to Embodiment 1.

In S1101, the query execution unit 423 (the memory resource management unit 425) performs memory resource allocation processing to the target master task. Details of the memory resource allocation processing are as shown in FIG. 15.

In S1102, the query execution unit 423 updates information of the query execution management table 424 corresponding to a target query block. Specifically, the query execution unit 423 adds 1 to the number of execution tasks 905 corresponding to the target query block.

Figure 12:
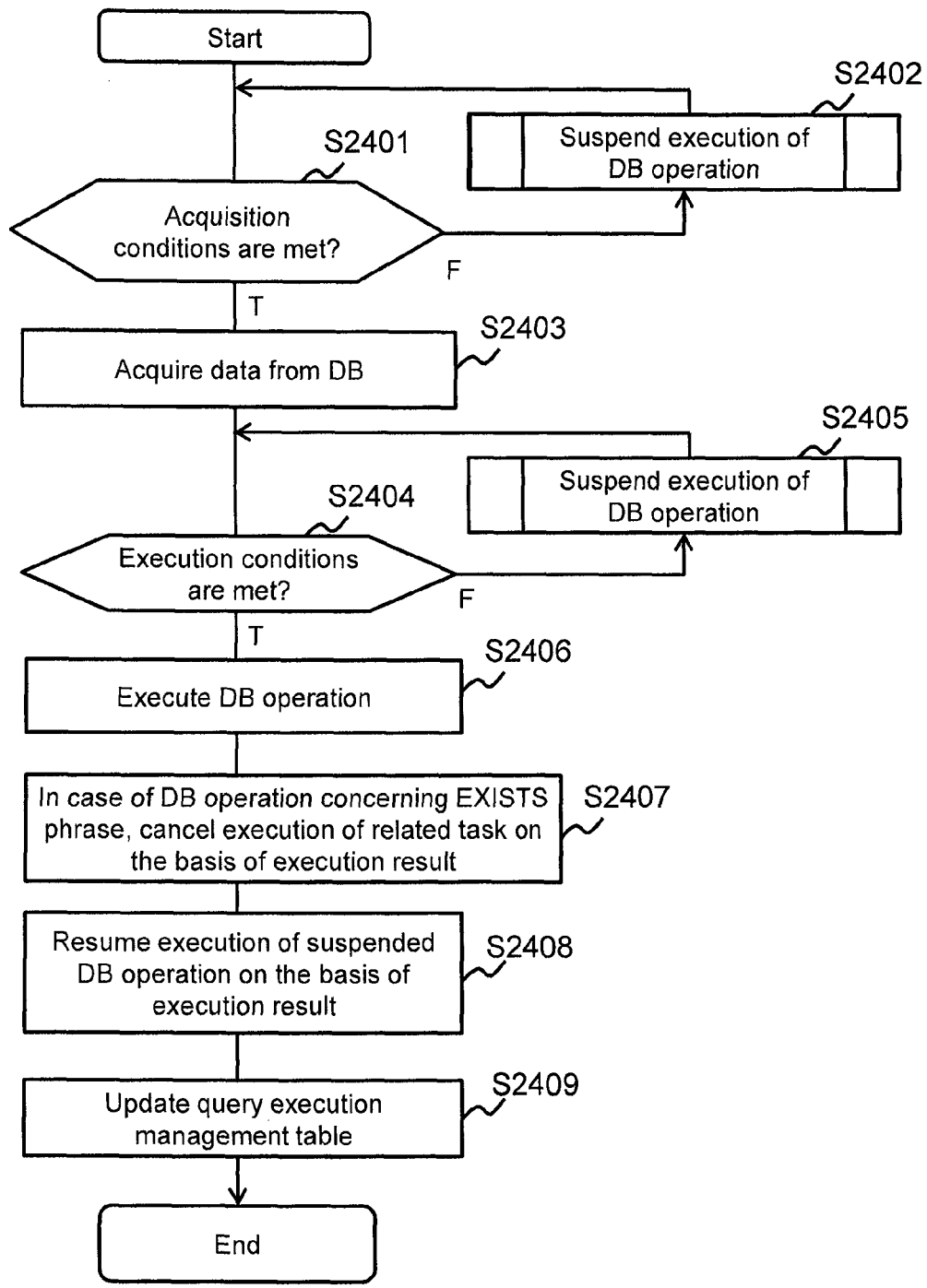
FIG. 12 shows a flow of DB operation execution processing according to Embodiment 1.

In S1103, the query execution unit 423 performs DB operation execution processing corresponding to the target master task. Details of the DB operation execution processing are as shown in FIG. 12.

In S1104, the query execution unit 423 calculates, based on a result of the execution of the DB operation executed in S1103, the number of generatable tasks, which is the number of slave tasks that can be newly generated to perform the next DB operation on a query execution plan. For example, it is assumed that, in S1103, the query execution unit 423 executes a DB operation for searching for a RowID List "a1" of the index A shown in FIG. 1 according to the target master task. In this case, the query execution unit 423 determines based on a result of the execution that the number of slave tasks that can be newly generated to respectively fetch data including the five records (the first record, the third record, the sixth record, the seventh record, and the ninth record) of the table A (the next DB operation on the query execution plan in FIG. 4) is five and calculates the number as the number of generatable tasks. Note that, when the DB operation corresponding to the target master task is, for example, result generation of query execution and the next DB operation is absent, the query execution unit 423 calculates the number of generatable tasks as zero. When the number of generatable tasks is generated as zero, the query execution unit 423 performs nothing in steps S1105, S1106, S1107, and S1108 and performs step S1109.

In S1105, the query execution unit 423 (the simultaneous-task-generation number determination unit 431) performs the determination processing of simultaneous-task-generation number. Details of the determination processing of simultaneous-task-generation number are as shown in FIG. 14. According to FIG. 14, the query execution unit 423 reserves, according to the determination processing of simultaneous-task-generation number, memory resources to be respectively allocated to tasks of the number of simultaneously generated tasks.

In S1106, the query execution unit 423 requests the execution task management unit 426 to generate slave tasks in number same as the number of simultaneous task generation determined in S1105. The execution task management unit 426 generates the requested number of tasks. Note that when the number of generated slave tasks is smaller than the number of simultaneous task generation, the query execution unit 423 may cancel the reservation of memory resources related to un-generated tasks in the number of simultaneous task generation among the memory resources reserved in S1105.

In S1107, concerning the respective slave tasks generated in S1106, the query execution unit 423 performs, in parallel, based on the execution result of the DB operation corresponding to the target master task in S1103, the task execution processing (the processing shown in FIG. 10) for the next DB operation.

In S1108, the query execution unit 423 determines whether all the slave tasks of the number of generatable tasks calculated in S1104 are generated. If a result of the determination is affirmative, the query execution unit 423 performs S1109. If the result of the determination is negative, the query execution unit 423 performs S1111.

In S1109, the query execution unit 423 updates the information of the query execution management table 424 corresponding to the target query block. Specifically, the query execution unit 423 subtracts 1 from the number of execution tasks 905 corresponding to the target query block.

Figure 16:
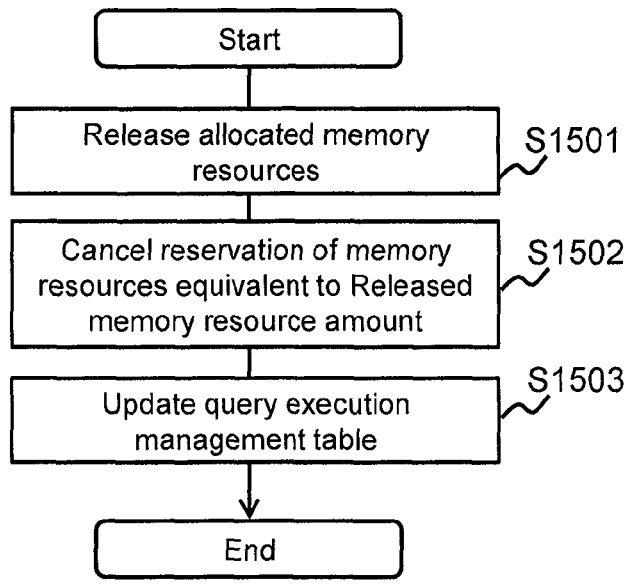
FIG. 16 shows a flow of memory resource release processing according to Embodiment 1.

In S1110, the query execution unit 423 (the memory resource management unit 425) performs memory resource release processing for releasing memory resources releasable concerning the executed target master task. Details of the memory resource release processing are as shown in FIG. 16. After S1110, the query execution unit 423 instructs the execution task management unit 426 to end the target master task.

In S1111, the query execution unit 423 determines whether generation of a new slave task is possible. This processing is the same as S1007 in FIG. 9. If a result of the determination in S1111 is affirmative, the query execution unit 423 performs S1105 again. If the result of the determination in S1111 is negative, the query execution unit 423 performs S1112.

In S1112, the query execution unit 423 performs the task generation suspension processing. Details of the task generation suspension processing are as shown in FIG. 11.

FIG. 11 shows a flow of the task generation suspension processing (S1008 in FIG. 9 and S1112 in FIG. 10). In FIG. 11, a flow of the task generation suspension processing for one task is described as an example. The task is referred to as "target task" and a query block executed by the target task is referred to as "target query block".

In S1201, the query execution unit 423 updates information of the query execution management table 424 corresponding to the target query block. Specifically, the query execution unit 423 adds 1 to the number of task generation-waiting tasks 906 corresponding to the target query block.

In S1202, the query execution unit 423 holds off the target task until generation of a new task becomes possible or a fixed time elapses. Processing for determining "whether generation of a new task is possible" is the same as S1007 in FIG. 9. In S1202, the query execution unit 423 repeats the processing same as S1007 at a predetermined time interval, for example, until generation of a new task becomes possible. In the task generation suspension processing, it is considered that a new task can be generated, for example, when an event of (y) or (z) described below occurs:

(y) concerning the target query block, a memory resource amount allocatable to the execution of the target query block increases because, for example, the priority 901 rises or the highest priority flag 902 is given; and (z) the unreserved memory resource amount 911 or the allocatable total memory resource amount 912 increases. Note that, in S1202, the query execution unit 423 may refer to the query execution management table 424 and, when a predetermined time elapses from the execution start time 904 corresponding to the target query block, end the execution of the query related to the target query block in error. In ending the execution of the query in error, the query execution unit 423 releases memory resources related to the execution of the query and cancels reservation of the memory resources and ends the related task.

In S1203, the query execution unit 423 updates the information of the query execution management table 424 corresponding to the target query block. Specifically, the query execution unit 423 subtracts 1 from the number of task generation-waiting tasks 906 corresponding to the target query block.

FIG. 12 shows a flow of the DB operation execution processing (S1103 in FIG. 10). In the description of FIG. 12, an execution target DB operation is referred to as "target DB operation", a query block including the target DB operation is referred to as "target query block", and a task corresponding to the target DB operation is referred to as "target task".

In S2401, the query execution unit 423 sets, in memory resources allocated to the target task, information for executing the target DB operation (e.g., an access destination of data required for the target DB operation and fetched data necessary for generating a result). The information for executing the target DB operation is set based on information included in a task, which is a generation source of the target task. The query execution unit 423 determines whether conditions for acquiring data of the DB 451 necessary for executing the target DB operation are satisfied. The satisfaction of the conditions for acquiring the data means that, for example, an access destination of the data necessary for the target DB operation is decided. If a result of the determination in S2401 is affirmative, the query execution unit 423 performs S2403. If a result of the determination in S2401 is negative, the query execution unit 423 performs S2402.

Figure 13:
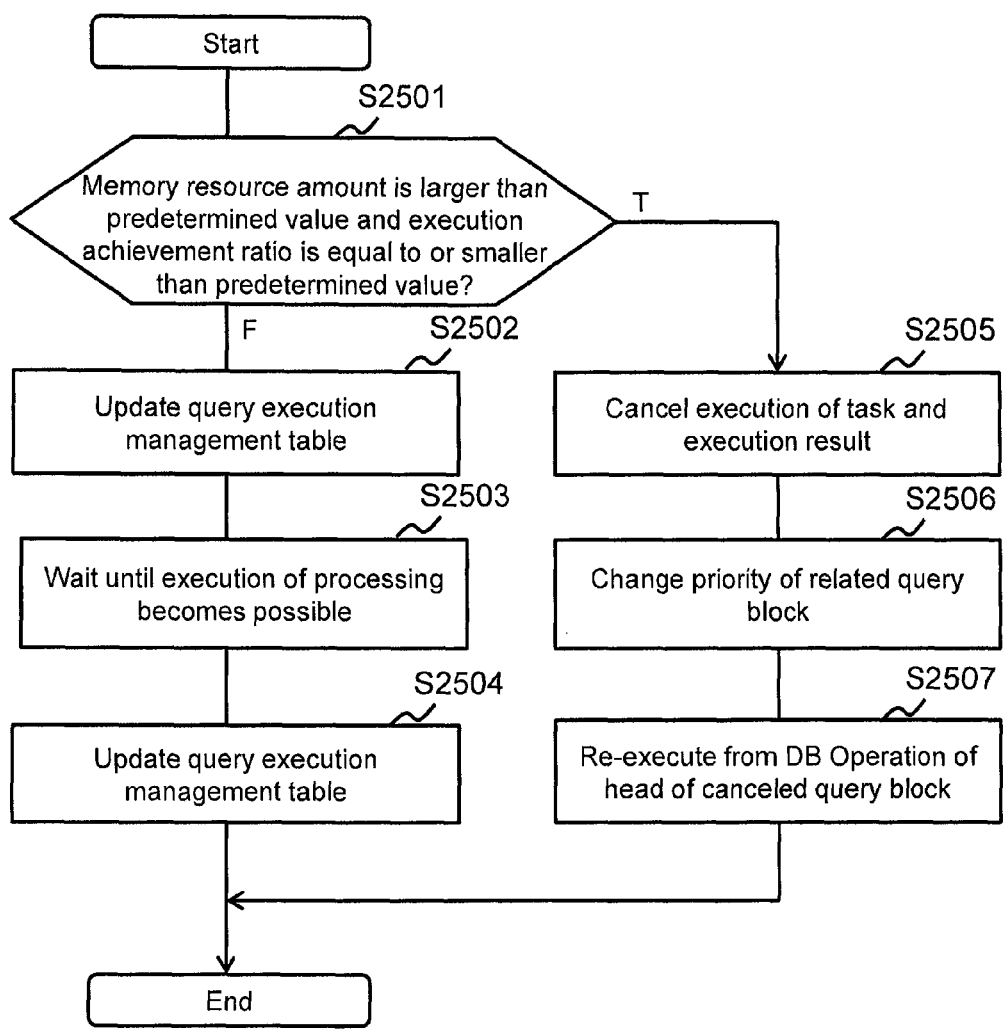
FIG. 13 shows a flow of DB operation execution suspension processing according to Embodiment 1.

In S2402, the query execution unit 423 performs the DB operation execution suspension processing. Details of the DB operation execution suspension processing are as shown in FIG. 13. According to FIG. 13, the query execution unit 423 suspends a start of the execution of the target task according to the DB operation execution suspension processing. For example, concerning the access destination of the data necessary for the execution of the target DB operation, the query execution unit 423 suspends generation of a result of a referred query block referred to as the access destination.

In S2403, the query execution unit 423 acquires data from the DB 451. Specifically, the query execution unit 423 issues a request for reading out the data necessary for the target DB operation from the DB 451. When receiving a response to the request, the query execution unit 423 acquires the data necessary for the target DB operation. Note that, when the data necessary for the target DB operation is present on a DB buffer, the query execution unit 423 acquires the data on the DB buffer.

In S2404, the query execution unit 423 determines whether conditions for executing the target DB operation are satisfied. For example, a case in which the target DB operation is extraction of a column from a certain record is examined. In this case, the satisfaction of the conditions for executing the target DB operation means that, in records included in the data acquired in S2403, conditions for selecting an execution target record of the target DB operation are decided. If a result of the determination in S2404 is affirmative, the query execution unit 423 performs S2406. If the result of the determination in S2404 is negative, the query execution unit 423 performs S2405.

In S2405, the query execution unit 423 performs the DB operation execution suspension processing. Details of the DE operation execution suspension processing are as shown in FIG. 13. According to FIG. 13, the query execution unit 423 suspends a start of the execution of the target task according to the DB operation execution suspension processing. For example, the query execution unit 423 holds off generation of a result of a referred query block referred to from the target DB operation.

In S2406, the query execution unit 423 executes the target DB operation. For example, the query execution unit 423 selects a record satisfying the selection conditions described in S2404 from the records included in the data acquired in S2403 and extracts a designated column from the record.

In S2407, when the target DB operation relates to an EXISITS phrase, the query execution unit 423 cancels the execution of the related task based on the execution result of the target DB operation.

It is assumed that the EXISTS phrase relates to a sub-query not having a correlation condition. Concerning a query including the sub-query related to the EXISTS phrase, the query execution unit 423 can execute a query block related to the sub-query and a query block in an outer side portion of the sub-query in parallel. In step S2407, if an evaluation result of the EXISTS phrase of the query block related to the sub-query is true, the query execution unit 423 cancels execution of a task (a task being executed or a task that waits for generation of a task) related to the query block related to the sub-query. Specifically, the query execution unit 423 ends the task and executes release of the memory resources allocated to the task and cancellation of reservation for the memory resources. In this case, concerning the query block on the outer side portion of the sub-query, the query execution unit 423 continues the execution. The query execution unit 423 (the query block priority control unit 432) may allocate the priority of the query block related to the sub-query to the query block in the outer side portion of the sub-query that continues the execution. On the other hand, if the evaluation result of the EXISTS phrase of the query block related to the sub-query is false, The query execution unit 423 cancels the execution of all tasks related to the query block related to the sub-query and the query block in the outer side portion of the sub-query. The query execution unit 423 replies the query issue source that a record corresponding to the query is absent. When cancelling the execution of the task, when the task to be cancelled issues an I/O request to the OS and the external storage apparatus, the query execution unit 423 may issue an instruction for cancelling the I/O request to the OS and the external storage apparatus.

Note that the EXISTS phase relates to a sub-query having a correlation condition, the query execution unit 423 may perform processing same as the processing described above. Specifically, the query execution unit 423 executes the query including the sub-query including the EXISTS phrase, that is, a query including, in the sub-query, a column of a table designated by a FROM phrase on the outer side of the sub-query. In this case, if the evaluation result of the EXISTS phrase is true, the query execution unit 423 may cancel the execution of the task related to the query block related to the sub-query for which the evaluation result is generated. The query execution unit 423 may continue the execution of the task related to the query block in the outer side portion of the sub-query due to the execution of the query block. On the other hand, if the evaluation result of the EXISTS phrase is false, the query execution unit 423 may cancel the execution of the task related to the query block related to the sub-query for which the evaluation result is generated. The query execution unit 423 may cancel the execution of the task related to the query block in the outer side portion of the sub-query due to the execution of the query block.

In S2408, if there is a task that can resume the execution of the corresponding DB operation among the tasks, execution of which is suspended in S2402 or S2405, the query execution unit 423 resumes the execution of the task based on the execution result of the target DB operation. For example, when a result of the target query block is generated by the execution of the target DB operation, the query execution unit 423 resumes the execution of the task if there is a task waiting for a start of execution for referring to the result of the target query block.

In S2409, the query execution unit 423 updates the information of the query execution management table 424 corresponding to the target query block. Specifically, the query execution unit 423 updates the execution achievement ratio 908 corresponding to the target query block.

FIG. 13 shows a flow of the DB operation execution suspension processing (S2402 and S2405 in FIG. 12). In description of FIG. 13, a target DB operation, execution of which is suspended, is referred to as "target DB operation" and a query block including the target DB operation is referred to as "target query block", and a task corresponding to the target DB operation is referred to as "target task".

In S2501, the query execution unit 423 determines whether a memory resource amount allocated to an execution-waiting task of the target query block is larger than a predetermined amount (or the number of execution-waiting tasks of the target query block is larger than a predetermined value) and an execution achievement ratio of the target query block is equal to or smaller than a predetermined value. If a result of the determination in S2501 is affirmative, the query execution unit 423 performs S2505. A situation in which the result of the determination in S2501 is affirmative is a situation in which, in the execution of the target query block, since a large number of tasks wait for execution completion of other query blocks having a reference relation, it is highly likely that memory resources are wastefully consumed and an execution progress degree of the target query block is small with respect to an execution progress degree of all the query blocks. On the other hand, if the result of the determination in S2501 is negative, the query execution unit 423 performs S2502.

In S2502, the query execution unit 423 updates the information of the query execution management table 424 corresponding to the target query block. Specifically, the query execution unit 423 adds 1 to the number of execution-waiting tasks 907 corresponding to the target query block.

In S2503, the query execution unit 423 holds off the target task until the execution of the target DB operation can be started. Note that concerning a task, execution of which is suspended, in S2408 in FIG. 12, if there is a task that can start execution, the query execution unit 423 resumes the execution of the task based on a result of the DB operation.

In S2504, the query execution unit 423 updates the information of the query execution management table 424 corresponding to the target query block. Specifically, the query execution unit 423 subtracts 1 from the number of execution-waiting task 907 corresponding to the target query block.

In S2505, the query execution unit 423 cancels execution and execution results of all the tasks (the task being executed, the task generation-waiting task, and the task, execution of which is suspended) related to the target query block. Specifically, the query execution unit 423 ends the tasks and executes release of memory resources allocated for the execution and the execution results of the tasks and cancellation of reservation for the memory resources. Note that, in cancelling execution of a task, when the task to be cancelled issues an I/O request to the OS and the external storage apparatus, the query execution unit 423 may issue an instruction for canceling the I/O request to the OS and the external storage apparatus.

In S2506, the query execution unit 423 changes the corresponding priority 901 of the query execution management table 424 to allocate priority corresponding to the target query block to priority of a referred query block in a reference relation with the target query block. Since the priority of the query blocks is changed in this way, memory resources allocatable to the execution of the referred query block increase. Consequently, the query execution unit 423 can use the memory resources allocated to the execution of the target query block for the execution of the referred query block.

In S2507, the query execution unit 423 re-executes the target query block from a leading DB operation. Specifically, the query execution unit 423 generates a task corresponding to the leading DB operation of the target query block, for example. According to the task execution processing in FIG. 10, the query execution unit 423 allocates necessary memory resources to the task and executes the task. Consequently, the target query block once canceled is re-executed under appropriate priority.

FIG. 14 shows a flow of the determination processing of simultaneous-task-generation number (S1003 in FIG. 9 and S1105 in FIG. 10).

In S1301, the simultaneous-task-generation number determination unit 431 calculates a first memory resource amount, which is a memory resource amount required to be allocated per task to be newly generated, based on a memory resource amount required for a DB operation corresponding to a task to be newly generated, which is information included in a query execution plan. Note that, when a part of the memory resources necessary for the DB operation are shared among a plurality of tasks including the task to be newly generated, the simultaneous-task-generation number determination unit 431 may calculate the first memory resource amount not to redundantly count an amount of the memory resources shared among the tasks.

In S1302, the simultaneous-task-generation number determination unit 431 determines, based on the first memory resource amount calculated in S1301 and the number of generatable tasks calculated in the immediately preceding step of the determination processing of simultaneous-task-generation number (S1002 in FIG. 9 or S1104 in FIG. 10), a reserved memory resource amount, which is an amount of memory resources reserved for allocation to the task to be newly generated. The reserved memory resource amount may be, for example, a product of the first memory resource amount and the number of generatable tasks.

In S1303, the simultaneous-task-generation number determination unit 431 requests the memory resource management unit 425 to reserve memory resources for the reserved memory resource amount determined in S1302. The memory resource management unit 425 receives the request, performs memory resource reservation processing shown in FIG. 17, and notifies the simultaneous-task-generation number determination unit 431 of an amount of memory resources successfully reserved. The amount of the memory resources successfully reserved may be, for example, an integer times of the first memory resource amount.

In S1304, the simultaneous-task-generation number determination unit 431 determines the number of simultaneous task generation based on the amount of the memory resources successfully reserved in S1303 and the first memory resource amount calculated in S1301. The number of simultaneous task generation may be, for example, a value obtained by dividing (the amount of the memory resources successfully reserved in S1303) by the (first memory resource amount). When the remaining memory resources are left, the simultaneous-task-generation number determination unit 431 may request the memory resource management unit 425 to cancel reservation for the remaining memory resource amount.

FIG. 15 shows a flow of the memory resource allocation processing (S1101 in FIG. 10). FIG. 15 shows a flow for explaining one task (referred to as "target task" in the description of FIG. 15) as an example. Note that, in the description of FIG. 15, a query block executed by the target task is referred to as "target query block".

In S1401, the memory resource management unit 425 refers to the query execution management table 424 and acquires information concerning the target query block.

In S1402, the memory resource management unit 425 determines whether P+Q is equal to or smaller than R. P, Q, and R are as described below. In the following description, a newly allocated memory resource amount Q can be predicted from a first memory resource amount (the calculated value in S1301 in FIG. 14) based on a query execution plan. However, the prediction is not always complete. Q in actually executing the target task is likely to be different from a predicted memory resource amount, that is, the amount of the memory resource reserved in S1303 in FIG. 14.

P=The allocated memory resource amount 909 corresponding to the target query block.

Q=A newly allocated memory resource amount necessary for executing the target task.

R=The reserved memory resource amount 910 corresponding to the target query block.

If a result of the determination in S1402 is negative (S1402: F), the memory resource management unit 425 waits until any one event among events (1) to (3) described below corresponding to the target query block is detected:
(1) the allocated memory resource amount 909 decreases;
(2) the reserved memory resource amount 910 increases; and
(3) a fixed time elapses.

When any one event is detected, the memory resource management unit 425 may perform S1402 again. If a result of the determination in S1402 is affirmative (S1402: T), the memory resource management unit 425 performs S1403.

In S1403, the memory resource management unit 425 updates the query execution management table 424. For example, the memory resource management unit 425 adds the newly allocated memory resource amount in S1402 to the allocated memory resource amount 909 corresponding to the target query block.

In S1404, the memory resource management unit 425 allocates memory resources for the newly allocated memory resource amount to the target task out of the reserved memory resources.

FIG. 16 shows a flow of the memory resource release processing (S1110 in FIG. 10). FIG. 16 shows a flow for explaining one task (in description of FIG. 16, referred to as "target task") as an example. Note that, in the description of FIG. 16, a query block executed by the target task is referred to as "target query block".

In S1501, the memory resource management unit 425 releases memory resources allocated to the target task. Note that the memory resource management unit 425 does not release memory resources shared by tasks different from the target task among the memory resources allocated to the target task.

In S1502, the memory resource management unit 425 cancels reservation of memory resources for the memory resource amount released in S1501.

In S1503, the memory resource management unit 425 updates information of the query execution management table 424 corresponding to the target query block. For example, the memory resource management unit 425 subtracts an amount of the memory resources released in S1501 from the allocated memory resource amount 909 and the reserved memory resource amount 910 corresponding to the target query block and adds the amount of the memory resources to the unreserved memory resource amount 911.

Figure 17:
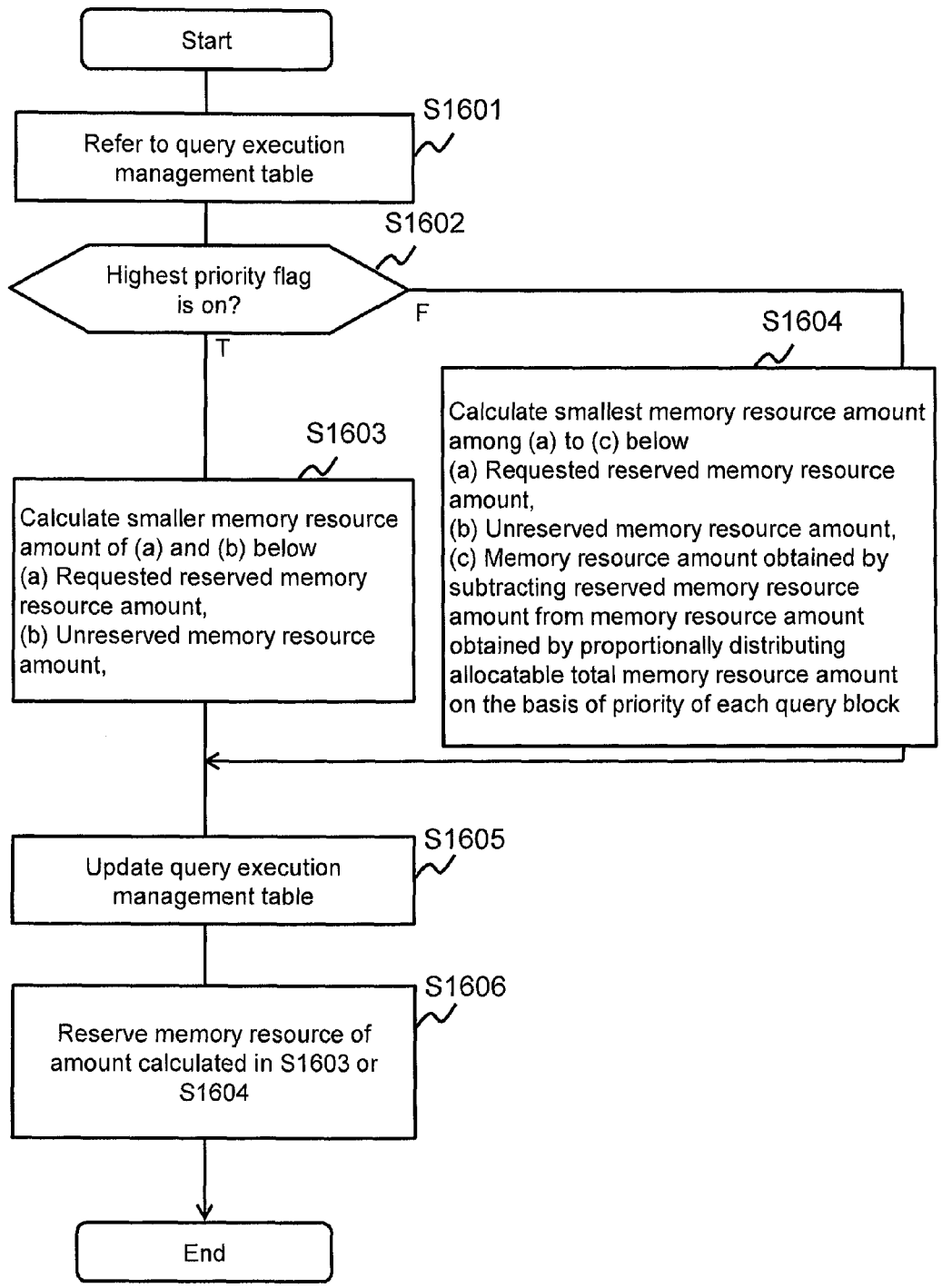
FIG. 17 shows a flow of memory resource reservation processing according to Embodiment 1.

FIG. 17 shows a flow of the memory resource reservation processing (S1303 in FIG. 14). FIG. 17 shows a flow for explaining one task (in description of FIG. 17, referred to as "target task") as an example. Note that, in the description of FIG. 17, a query block related to the target task is referred to as "target query block".

In S1601, the memory resource management unit 425 refers to the query execution management table 424 and obtains information concerning the target query block.

In S1602, the memory resource management unit 425 determines whether the highest priority flag 902 corresponding to the target query block is on.

If a result of the determination in S1602 is affirmative (S1602: T), in S1603, the memory resource management unit 425 calculates a smaller memory resource amount of (a) and (b) described below:
(a) a requested reserved memory resource amount; and
(b) the unreserved memory resource amount 911.

If the result of the determination in S1602 is negative (S1602: F), in S1604, the memory resource management unit 425 calculates a smallest memory resource amount among (a) to (c) described below:
(a) the requested reserved memory resource amount;
(b) the unreserved memory resource amount 911; and
(c) a memory resource amount obtained by subtracting the reserved memory resource amount 910 corresponding to the target query block from an upper limit of a memory resource amount allocatable to execution of the target query block.

Note that (c) "an upper limit of a memory resource amount allocatable to execution of the target query block" is a value corresponding to the target query block among values obtained by distributing (e.g., proportionally distributing), for each query block, the allocatable total memory resource amount 912 based on the priority of 901 of each query block being executed. For example, as shown in FIG. 8, a case is examined in which the allocatable total memory resource amount 912 is "100 MB (megabyte)" and the priorities of the query blocks 1 to 3 are "3", "2", and "5". It is assumed that the allocatable total memory resource amount 912 is proportionally distributed based on the priority 901 of each query block. In this case, upper limits of memory resource amounts allocatable to execution of query blocks are "30 MB" concerning the query block 1, "20 MB" concerning the query block 2, and "50 MB" concerning the query block 3.

For example, when the number of query blocks being simultaneously executed increases or when a query block, the highest priority flag 902 of which is on is being executed, the memory resource amount of (c) sometimes takes a negative value. In that case, the memory resource management unit 425 sets the memory resource amount calculated in S1604 to zero.

In S1605, the memory resource management unit 425 updates the query execution management table 424. For example, the memory resource management unit 425 adds the memory resource amount calculated in S1603 or S1604 to the reserved memory resource amount 910 corresponding to the target query block. Further, the memory resource management unit 425 subtracts the memory resource amount calculated in S1603 or S1604 from the unreserved memory resource amount 911.

In S1606, the memory resource management unit 425 reserves the memory resources of the amount calculated in S1603 or S1604 out of unreserved memory resources among memory resources allocatable to query execution.

A total amount of the memory resources allocatable to the query execution described in this embodiment sometimes increases or decreases because of various factors. As the factors, for example, on the inside of the DBMS 412, a memory resource amount managed by the execution task management unit 426 (for a task for executing a query) is increased or decreased or a memory resource amount managed by the DB buffer management unit 427 (for a DB buffer) is increased or decreased. Further, for example, on the outside of the DBMS 412, a use status of memory resources of other computer programs executed on the same memory 416, addition or reduction of the memory 416, or a change in a total memory resource amount of a virtual machine in the case where the DB server 401 is the virtual machine. In particular, according to virtualization of computer resources in a cloud environment spreading in recent years, the total amount of the memory resources allocatable to the query execution sometimes changes according to a situation.

Figure 18:
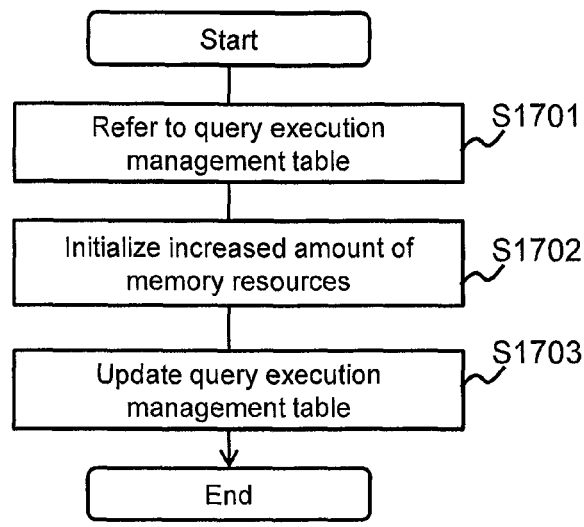
FIG. 18 shows a flow of memory resource increase processing according to Embodiment 1.

FIG. 18 shows a flow of memory resource increase processing.

The memory resource increase processing is processing for increasing the allocatable total memory resource amount 912, which is a total amount of memory resources allocatable to execution of a query. This processing may be started when the increase factors of the memory resource amount occur.

In S1701, the memory resource management unit 425 refers to the query execution management table 424.

In S1702, the memory resource management unit 425 initializes an increasing amount of memory resources to the allocatable total memory resource amount 912 in order to use the memory resources for the query execution and manages the memory resources as unreserved memory resources.

In S1703, the memory resource management unit 425 updates the query execution management table 424. For example, the memory resource management unit 425 adds the amount of the memory resources managed in S1702 to the unreserved memory resource amount 911 and the allocatable total memory resource amount 912.

Figure 19:
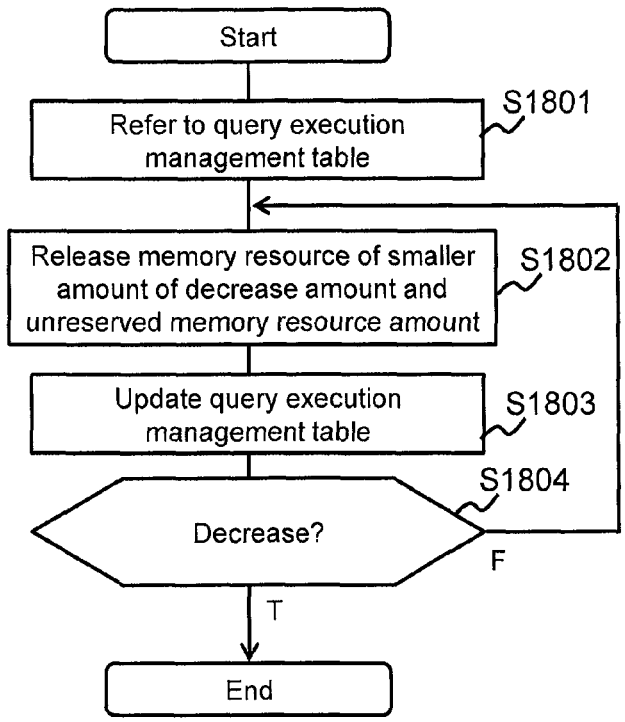
FIG. 19 shows a flow of memory resource decrease processing according to Embodiment 1.

FIG. 19 shows a flow of memory resource decrease processing.

The memory resource decrease processing is processing for reducing the allocatable total memory resource amount 912. This processing may be started when the decrease factors of the memory resource amount occur.

In S1801, the memory resource management unit 425 refers to the query execution management table 424.

In S1802, the memory resource management unit 425 discriminates a smaller amount of the unreserved memory resource amount 911 and an amount reduced from the allocatable total memory resource amount 912. The memory resource management unit 425 releases memory resources of the discriminated amount out of the unreserved memory resources among the memory resources allocatable to the query execution.

In S1803, the memory resource management unit 425 updates the query execution management table 424. For example, the memory resource management unit 425 reduces the amount of the memory resources released in S1802 from the unreserved memory resource amount 911 and the allocatable total memory resource amount 912.

In S1804, the memory resource management unit 425 determines whether the memory resources of the amount reduced from the allocatable total memory resource amount 912 are released. If a result of the determination is affirmative, the memory resource management unit 425 ends the processing. On the other hand, if the result of the determination is negative, the memory resource management unit 425 performs S1802 again. A case in which the result of the determination is negative is a case in which the memory resource management unit 425 releases the memory resources for the unreserved memory resource amount 911 in S1802. That is, the amount of the memory resources released in S1802 is smaller than the amount reduced from the allocatable total memory resource amount 912. In the case, the memory resource management unit 425 performs S1802 again and releases memory resources of a difference amount between the amount reduced from the allocatable total memory resource amount 912 and the amount of the memory resources released in S1802 last time.

Figure 20:
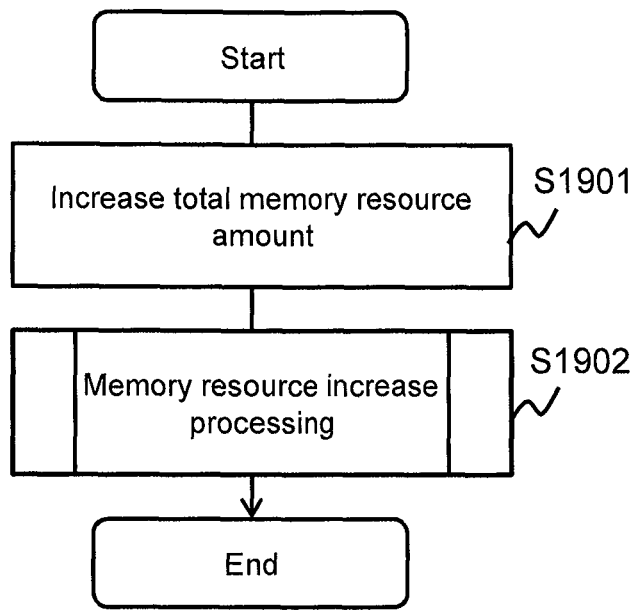
FIG. 20 shows a flow of server memory resource increase processing according to Embodiment 1.

FIG. 20 shows a flow of server memory resource increase processing.

The server memory resource increase processing is processing for increasing a total memory resource amount recognized by the OS 415, for example, when the memory 416 of the DB server 401 is added or when the DB server 401 is a virtual machine and a total memory resource amount of the virtual machine is increased.

In S1901, the OS 415 increases the total memory resource amount. For example, it is assumed that the memory 416 of the DB server 401 is added by an administrator of the DB sever 401. Alternatively, when the DB server 401 is a virtual machine, it is assumed that a total memory resource amount of the virtual machine is increased. In this case, the OS 415 recognizes an increase in the total memory resource amount by an amount equivalent to the addition of the memory 416 or the increased amount.

In S1902, the memory resource management unit 425 in the DBMS 412 performs the memory resource increase processing shown in FIG. 18 concerning the amount of the memory resources increased in S1901. Note that the DBMS 412 may increase an amount of memory resources managed by the execution task management unit 426, memory resources managed by the DB buffer management unit 427, or the like, which are memory resources used in the DBMS 412.

Figure 21:
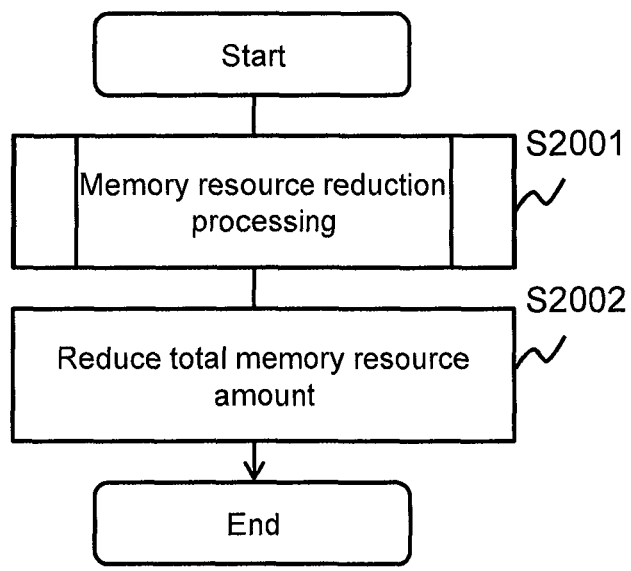
FIG. 21 shows a flow of server memory resource decrease processing according to Embodiment 1.

FIG. 21 shows a flow of server memory resource decrease processing.

The server memory resource decrease processing is processing for reducing a total memory resource amount recognized by the OS 415, for example, when the memory 416 of the DB server 401 is added or when the DB server 401 is the virtual machine and a total memory resource amount of the virtual machine is reduced.

In S2001, the memory resource management unit 425 in the DBMS 412 performs the memory resource decrease processing shown in FIG. 19 concerning a memory resource amount to be reduced. Note that the DBMS 412 may reduce an amount of memory resources managed by the execution task management unit 426, memory resources managed by the DB buffer management unit 427, or the like, which are memory resources used in the DBMS 412.

In S2002, the OS 415 reduces the total memory resource amount. For example, it is assumed that the memory 416 equivalent to the amount of the memory resources reduced in S2001 is reduced by the administrator of the DB server 401. Alternatively, when the DB server 401 is the virtual machine, it is assumed that the total memory resource amount of the virtual machine is reduced by the amount of the memory resources reduced in S2001. In this case, the OS 415 recognizes a reduction in the total memory resource amount by an amount equivalent to the reduction of the memory 416 or the reduced amount.

Figure 22:
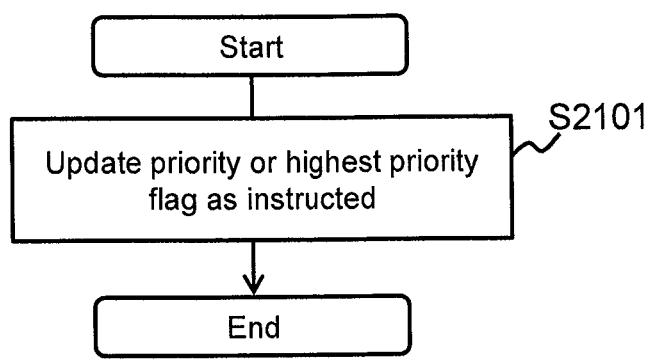
FIG. 22 shows a flow of priority manual change processing according to Embodiment 1.

FIG. 22 shows a flow of priority manual change processing. In the following description, one query block (in description of FIG. 22, referred to as "target query block") is described as an example.

In S2101, the query receiving unit 421 receives a priority change instruction related to the target query block and issues the priority change instruction for the target query block to the query execution unit 423. A transmission source of the priority change instruction may be the same as or different from an issue source of a query related to the target query block. The query execution unit 423 (the query block priority control unit 432) receives the instruction and changes the priority 901 or the highest priority flag 902 corresponding to the target query block in the query execution management table 424 according to content of the instruction.

Figure 23:
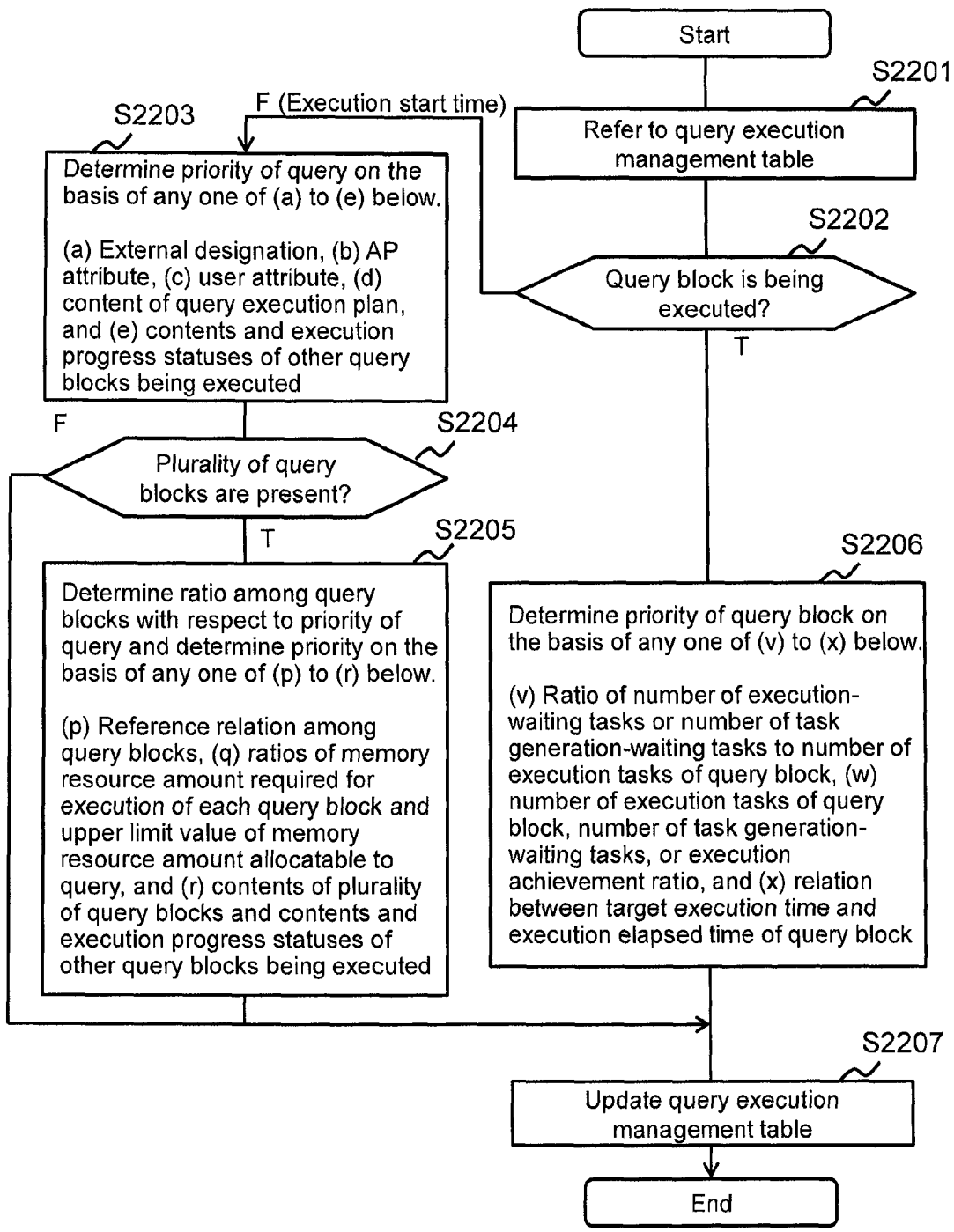
FIG. 23 shows a flow of priority automatic change processing according to Embodiment 1.

FIG. 23 shows a flow of priority automatic change processing. This processing may be started according to update of the query execution management table 424, for example, when execution of a received query is started or when an execution progress state of a query block being executed (e.g., a status of a task that is executing the query block). This processing is processing for determining priority concerning the query block to be update in the query execution management table 424. In the following description, a query block for which priority is determined (in description of FIG. 23, referred to as "target query block") is described as an example. In the description of FIG. 23, a query corresponding to a query execution plan including the target query block is referred to as "target query".

In S2201, the query block priority control unit 432 refers to the query execution management table 424 and obtains information concerning the target query block.

In S2202, the query block priority control unit 432 determines whether the target query block is being executed. For example, the query block priority control unit 432 determines whether the number of execution tasks 905 or the execution achievement ratio 908 corresponding to the target query block is larger than zero. If a result of the determination in S2202 is affirmative, the query block priority control unit 432 performs S2206. On the other hand, if the result of the determination in S2202 is negative, since this means execution start time of the target query, the query block priority control unit 432 performs S2203.

In S2203, the query block priority control unit 432 determines priority of the target query based on any one of (a) to (e) described below:
(a) an external instruction;
(b) an AP attribute of a target query issue source;
(c) a user attribute of the target query issue source;
(d) content of the query execution plan of the target query; and
(e) content of the target query and content and an execution progress status of another query block being executed.

For example, in (a), the query block priority control unit 432 may determine the priority of the target query based on priority designated by the target query itself. For example, in (e), when data of the DB 451 accessed in the target query is generally the same as data of the DB 451 accessed in the other query block being executed and the execution achievement ratio 908 of the other query block being executed is smaller than a predetermined value, the query block priority control unit 432 may set the priority of the target query to a numerical value higher than the priority 901 of the other query block being executed.

In S2204, the query block priority control unit 432 determines whether a plurality of the target query blocks are included in the query execution plan of the target query. If a result of the determination in S2204 is affirmative, the query block priority control unit 432 performs S2205. On the other hand, if the result of the determination in S2204 is negative, since there is one target query block related to the target query, the query block priority control unit 432 determines the priority determined in S2203 as the priority of the target query block and performs S2207.

In S2205, the query block priority control unit 432 determines a ratio among the target query blocks with respect to the priority of the target query determined in S2203 based on any one of (p) to (r) described below:
(p) a reference relation among the target query blocks;
(q) a ratio of a memory resource amount required for execution of each of the target query blocks to an upper limit of a memory resource amount allocatable to execution of the target query (all the target query blocks); and
(r) content of the target query block and content and an execution progress status of another query block being executed.

The query block priority control unit 432 determines priority of each of the target query blocks based on the determined ratio among the target query blocks.

For example, in (p), the query block priority control unit 432 may determine the ratio among the target query blocks based on a relation between a predicted number of DB operations (or a predicted number of I/Os) based on cost calculation until reference to a result of a referenced query block in a referring query block among the plurality of target query blocks and a predicted total number of DB operations (or a total predicted number of I/Os) of the referring query block. For example, in (p), the query block priority control unit 432 may determine the ratio among the target query blocks based on predicted task execution multiplicity based on DB statistical information of each plurality of target blocks.

A case is examined in which, as the target query blocks included in the query execution plan of the target query, two query blocks, i.e., a query block (a referenced query block) related to a sub-query not having a correlation condition and a query block (a referring query block) including a DE operation for referring to a result of the referred query block related to the outer side portion of the sub-query are included. In this case, a specific example in which the ratio among the target query blocks is determined will be described below.

Specific Example 1 in which a Ratio is Determined Based on (p)

When a result of the referred query block is referred to after a small predicted number of DB operations with respect to a predicted total number of DB operations based on cost calculation in the referring query block, the query block priority control unit 432 sometimes sets a ratio of the referred query block higher than a ratio of the referring query block. That is, the query block priority control unit 432 sometimes sets priority of the referred query block higher than priority referring query block. For example, at t0 in FIG. 6, the respective upper limits of the memory resource amounts allocatable to the execution of the query blocks are based on the priority of each of the query blocks determined according to this example.

Specific Example 2 in which a Ratio is Determined Based on (p)

Concerning one query block of the referring query block and the referred query block, when the predicted task execution multiplicity based on the DB statistical information is small, the query block priority control unit 432 sometimes sets a ratio of the one query block to a ratio equal to or higher than a predetermined percentage of a ratio of the other query block. That is, the query block priority control unit 432 sometimes sets priority of the one query block to priority equal to or higher than a predetermined percentage of priority of the other query block. Examples of the target query block corresponding to this example include a query block that is related to nest loop join processing of a plurality of tables and in which the number of records extracted from the outermost side table of the nest loop join processing is small and a relationship of the plurality of tables is one to one.

Specific Example in which a Ratio is Determined Based on (q)

When the memory resource amount required for the execution of the referred query block or the referring query block is equal to or higher than a predetermined percentage with respect to an upper limit of a memory resource amount allocatable to execution of the target query, the query block priority control unit 432 sometimes sets a ratio of the referred query block higher than a ratio of the referring query block. That is, the query block priority control unit 432 sometimes sets priority of the referred query block higher than priority of the referring query block. A memory resource amount required for execution of each query block is, for example, information included in a query execution plan or a predetermined amount. More specifically, the query block priority control unit 432 sometimes sets the ratio of the referring query block to zero and determines the priority of the target query determined in S2203 as the priority of the referred query block. "An upper limit of a memory resource amount allocatable to execution of the target query" is a value corresponding to the target query among values obtained by distributing (e.g., proportionally distributing) the allocatable total memory resource amount 912 to the query block being executed and the target query based on the priority 901 of each query block being executed and the priority of the target query determined in S2203. Examples of a query corresponding to this example include a query, a query execution plan of which is related to hash join processing of two tables. In this case, the referred query block in the query execution plan includes a DB operation related to build processing of a hash table in the hash join processing and a memory resource among required for the hash table is large.

Specific Example in which a Ratio is Determined Based on (r)

When contents of the referred query block and the referring query block are contents representing access to substantially the same data of the DB 451, the query block priority control unit 432 sometimes sets ratios of the referred query block and the referring query block to the same ratio. In other words, the query block priority control unit 432 sometimes places the same priority on the referred query block and the referring query block. Note that, when the content of the referred query block and content of another query block being executed are contents representing access to substantially the same data of the DB 451 and the execution achievement ratio 908 of the other query block being executed is smaller than a predetermined value, the query block priority control unit 432 may set the ratio of the referred query block higher than the ratio of the referring query block. That is, the priority of the referred query block may be set higher than the priority of the reference query block. More specifically, the query block priority control unit 432 may set the ratio of the reference query block to zero and determine the priority of the target query determined in S2203 as the priority of the referred query block.

In S2206, the query block priority control unit 432 determines priority of the target query block based on any one of (v) to (x) described below:
(v) a ratio of the number of execution-waiting tasks 907 or the number of task generation-waiting tasks 906 with respect to the number of execution tasks 905 of the target query block;
(w) the number of execution tasks 905 of the target query block, the number of task generation-waiting tasks 906, or the execution achievement ratio 908 based on cost calculation; and
(x) a relation between the target execution time 903 of the target query block and an execution elapsed time (time obtained by subtracting the execution start time 904 from the present time).

As in the description in S2205, a case is examined in which, as the target query blocks included in the query execution plan of the target query, two query blocks, i.e., a referenced query block related to a sub-query not having a correlation condition and a referring query block including a DB operation for referring to a result of the referred query block related to an outer side portion of the sub-query are included. In this case, a specific example in which the ratio among the target query blocks is determined will be described below. In this case, a specific example in which priority of the target query block is determined in S2206 will be described below.

Specific Example in which Priority is Determined Based on (v)

When the number of execution-waiting tasks 907 (or the number of task generation-waiting tasks 906) of the referring query block exceeds a predetermined threshold with respect to the number of execution tasks 905, the query block priority control unit 432 sometimes sets priority of the referred query block lower than a previous value and sets priority of the referred query block lower than a previous value not to change priority of the entire target query. Note that, when a memory resource amount allocated to an execution-waiting task (or a task generation-waiting task) of the referring query block exceeds a predetermined amount, the query block priority control unit 432 may change the priority of the target query block in the same manner as described above.

Specific Example in which Priority is Determined Based on (w)

When the execution achievement ratio 908 based on cost calculation of the referred query block is equal to or higher than a predetermined ratio and the number of execution tasks (or the task generation-waiting task) of the referred query block is equal to or smaller than a predetermined number, the query block priority control unit 432 sometimes sets priority of the referred query block lower than a previous value and sets priority of the referring query block higher than a previous value not to change priority of the entire target query. This indicates that execution of the referred query block is near an end. By changing the priority of each of the target query blocks as described above, the query execution unit 423 can allocate, concerning the referred query block in which necessary memory resources are decreasing, memory resources allocatable to execution of the referred query block to execution of referring query block. For example, at t2 and t3 in FIG. 6, variations of the respective upper limits of the memory resource amounts allocatable to the execution of the query blocks are based on the change of the priority of each of query blocks determined according to this example. Note that, when the execution of the referred query block is ended and the execution of the referring query block is near the end, the query block priority control unit 432 priority of the entire target query block (the target query) may be set lower than a previous value. Consequently, a memory resource amount allocated to the other query block being executed increases.

Specific Example in which Priority is Determined Based on (x)

The query block priority control unit 432 sometimes determines priority of the target query block based on at least one method among (1) to (3) described below:
(1) when the execution elapsed time approaches the target execution time 903 by a predetermined percentage, the priority of the target query block is set higher than a previous value;
(2) when the execution elapsed time passes the target execution time 903 by a predetermined percentage, the priority of the target query block is set higher than a previous value; and
(3) when the execution achievement ratio 908 is equal to or higher than a predetermined percentage and the execution elapsed time is smaller than a predetermined percentage of the target execution time 903, the priority of the target query block is set lower than a previous value.

In S2207, the query block priority control unit 432 changes the priority 901 corresponding to the target query block in the query execution management table 424 to the priority determined in S2205 or S2206.

According to the priority automatic change processing described above, the query block priority control unit 432 can determine priority suitable for execution of the query blocks at the start of the execution of the query and can dynamically determine priority suitable for the execution of the query blocks during the execution of the query.

Figure 24:
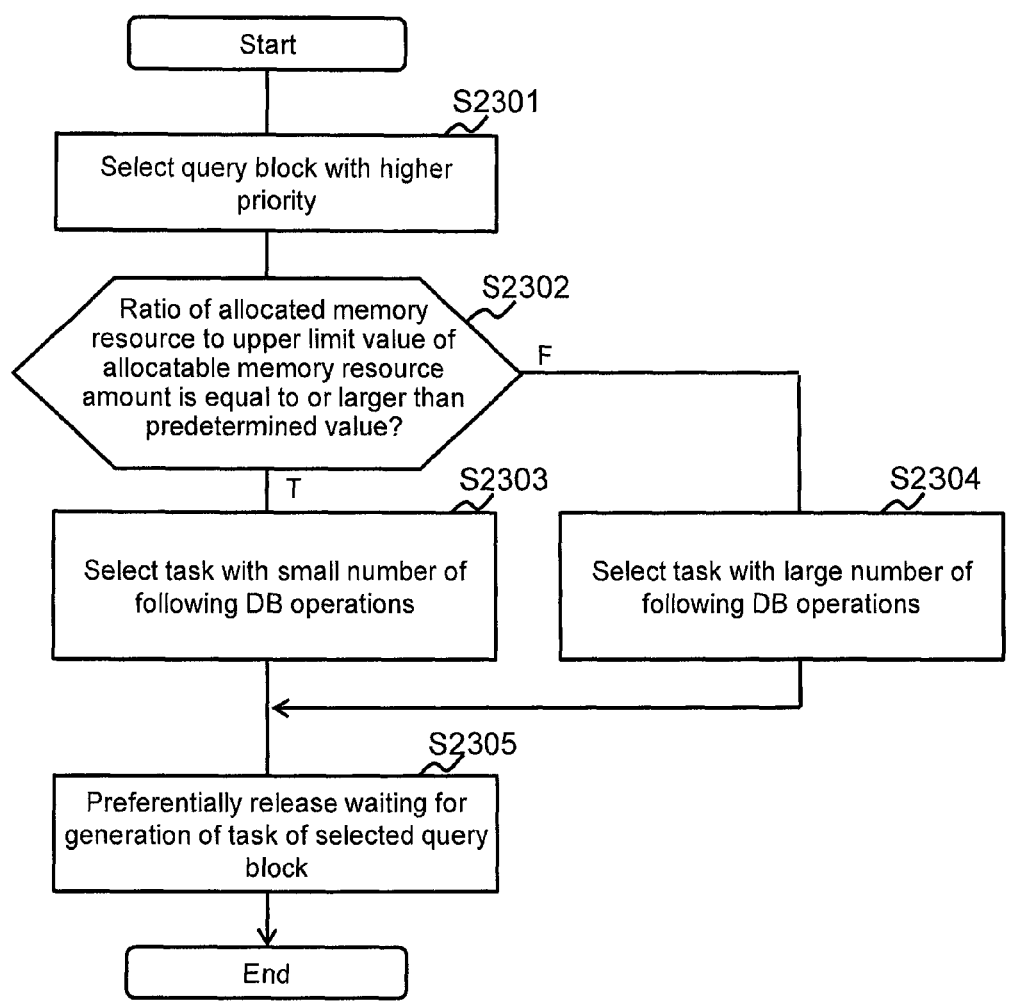
FIG. 24 shows a flow of task addition generation processing according to Embodiment 1.

FIG. 24 shows a flow of task addition generation processing.

The task addition generation processing is processing started, for example, when an event of (1) or (2) described below occurs:
(1) the allocatable total memory resource amount 912 or the unreserved memory resource amount 911 of the query execution management table 424 increases; and
(2) the priority 901 of a certain query block of the query execution management table 424 changes or the highest priority flag 902 changes to ON.

Note that, when the unreserved memory resource amount 911 of the query execution management table 424 is equal to or larger than a predetermined value, this task addition generation processing may be repeated until no task-generation suspended task is present concerning all the query blocks of the query execution management table 424.

In S2301, the query execution unit 423 refers to the query execution management table 424 and selects a query block having the highest priority 901 among query blocks in which task-generation suspended tasks (S1008 in FIG. 9 or S1112 in FIG. 10) are present. Specifically, the query execution unit 423 selects a query block having the highest priority 901 concerning query blocks in which the number of task generation-waiting tasks 906 is equal to or larger than zero.

In S2302, the query execution unit 423 determines, concerning the query block selected in S2301, whether a ratio of the allocated memory resource amount 909 to an upper limit of a memory resource amount allocatable to execution of the query block is equal to or larger than a predetermined ratio. "An upper limit of a memory resource amount allocatable to execution of the query block" is as described in S1604 in FIG. 17. If a result of the determination is affirmative, the query execution unit 423 performs S2303. If the result of the determination is negative, the query execution unit 423 performs S2304. A case in which the result of the determination is negative is often near a start of the execution of the query block selected in S2301 or near an end of the execution.

In S2303, the query execution unit 423 selects a task with a small number of DB operations following a DB operation corresponding to the task among task generation-waiting tasks in the query block selected in S2301.

In S2304, the query execution unit 423 selects a task with a large number of DB operations following a DB operation corresponding to the task among the task generation-waiting tasks in the query block selected in S2301.

In S2305, the query execution unit 423 preferentially releases the generation waiting for the task selected in S2303 and S2304.

Embodiment 2

Embodiment 2 will be described below. In the description, differences from Embodiment 1 are mainly described. Explanation is omitted or simplified concerning similarities to Embodiment 1.

It is assumed that the DBMS 412 stores the DB 451 including the table A, the index B, and the table B shown in FIG. 1 and FIG. 2 in the external storage apparatus 402. In Embodiment 2, it is assumed that the table A includes a column AC2 and the table B includes a column BC2. It is assumed that the DB 451 includes an index A' targeting the column AC2 of the table A. In Embodiment 2, the DBMS 412 executes a query including sub-queries having a correlation condition shown in FIG. 25. The query in FIG. 25 is a query for extracting a value of the column BC1 when, concerning the record of the table B, a value of which in the column B_Type of the table B is "PPP", a value of the column BC2 and a value of the column AC2 of the table A coincide with each other and, when the record of the table A, the value in the column A_Type is "AAA", is present. A sub-query concerning an EXISTS phrase in FIG. 25 includes description of a column of the table B designated by a FROM phrase on the outer side of the sub-query. Therefore, the sub-query is considered to have a correlation condition with an outer side portion of the sub-queries.

Figure 26:
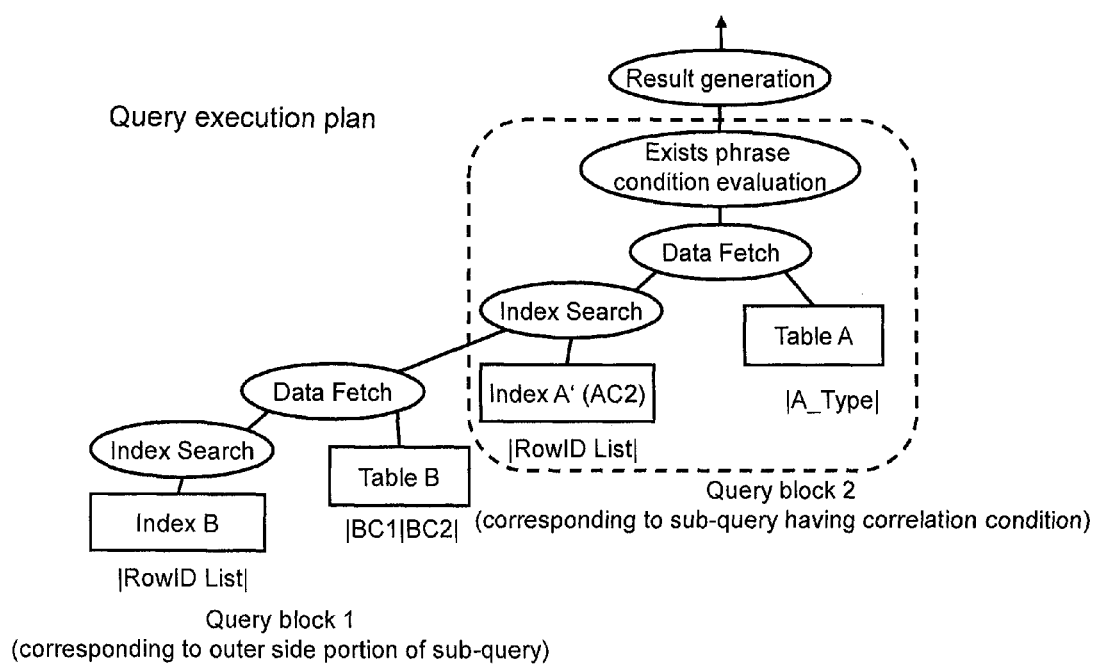
FIG. 26 shows a query execution plan according to Embodiment 2.

The DBMS 412 generates a query execution plan shown in FIG. 26 in order to execute the query in FIG. 25. The DBMS 412 extracts, based on a query execution plan in FIG. 26, using the index B, values of the columns BC1 and BC2 in a record including a designated value in the column B_Type of the table B. The DBMS 412 extracts, using the index A', a record including a value of the column AC2 of the table A that coincides with the extracted value of the BC2. The DBMS 412 determines whether a record, the column A_Type of which is a designated value, is present in the record. When the determination is affirmative, the DBMS 412 sets the extracted value of the column BC1 as a query execution result. Specifically, the DBMS 412 performs the processing for:

(S1) searching for, using the index B, a RowID List corresponding to the record of the table B including the designated value in the column B_Type;

(S2) fetching data including a corresponding record of the table B using the RowID List found in (S1) and extracting values of the columns BC1 and BC2 of the corresponding record;

(S3) searching for, using the index A', a RowID List of a record of the table A including a value of the column AC2 that coincides with the value of the column BC2 extracted in (S2).

(S4) fetching data including a corresponding record of the table A using the RowID List found in (S3) and extracting a record, the column A_Type of which is a designated value concerning the corresponding record;

(S5) determining whether the record extracted in (S4) is present and, if the record is present, performing (S6); and (S6) returning, as a result of query execution, the value of the column BC1 extracted in (S2) to a query issue source.

The query execution plan shown in FIG. 26 includes a query block 1 corresponding to execution of (S1), (S2), and (S6) and a query block 2 corresponding to execution of (S3) to (S5). That is, the query execution plan in FIG. 26 includes a query block 2 related sub-queries having a correlation condition and a query block 1 related to an outer side portion of the sub-queries. The DBMS 412 executes, based on the query execution plan in FIG. 26, the query block 2 and performs evaluation of an EXISTS phrase for each record of the table B extracted by execution of the query block 1. Therefore, a relation between speed of the extraction of a record of the table B by the execution of the query block 1 and speed of the evaluation of the EXISTS phrase by the execution of the query block 2 fluctuates depending on how limited memory resources are allocated to the execution of the query blocks. Therefore, a query execution time varies.

The Embodiment 2 is different from Embodiment 1 in a part of priority automatic change processing (see FIG. 23) executed by the query block priority control unit 432 of the DBMS 412.

FIG. 27 shows a part of a flow of the priority automatic change processing according to Embodiment 2.

In the priority automatic change processing according to Embodiment 2, S2205 in the priority automatic change processing shown in FIG. 23 is replaced with S2210 shown in FIG. 27. In description of FIG. 27, as in the description of FIG. 23, a query block for which priority is determined is referred to as "target query block" and a query corresponding to a query execution plan including the target query block is referred to as "target query".

In S2210, the query block priority control unit 432 determines a ratio among the target query blocks with respect to the priority of the target query determined in S2203 in FIG. 23 based on any one of (p) to (t) described below:

(p) a reference relation among the target query blocks;

(q) a ratio of a memory resource amount required for execution of each of the target query blocks to an upper limit of a memory resource amount allocatable to execution of the target query (all the target query blocks);

(r) content of the target query block and content and an execution progress status of another query block being executed;

(s) when the target block is related to a sub-query having a correlation condition, a predicted number of DB operations in the target query block, predicted task execution multiplicity, or a memory resource amount required for the execution of the task; and (t) when the target query block is related to a sub-query including an EXISTS phrase having a correlation condition, a predicted number of DB operations of a query block related to the outer side portion of the sub-query. The query block priority control unit 432 determines priority of each of the target query blocks based on the determined ratio among the target query blocks.

A case is examined in which, as the target query blocks included in the query execution plan of the target query, two query blocks, i.e., a query block (a correlated sub-query block) related to a sub-query having a correlation condition and a query block (a main query block) related to an outer side portion of the sub-query. In this case, a specific example in which the ratio among the target query blocks is determined will be described below. Note that (p), (q), and (r) are the same as those in Embodiment 1 specifically described in relation to the sub-query without the correlation condition. Therefore, description of (p), (q), and (r) is omitted.

Specific Example in which a Ratio is Determined Based on (s)

When the correlated sub-query block is included in the query execution plan of the target query, the query block priority control unit 432 sometimes sets a ratio of the correlated sub-query block higher than a ratio of the main query block when a numerical value of any one of (s1), (s2), and (s3) described below exceeds a predetermined value:

(s1) a predicted number of DB operations (a predicted number of I/Os) based on cost calculation in the correlated sub-query block;

(s2) predicted task execution multiplicity based on DE statistical information in the correlated sub-query block; and (s3) a ratio of a memory resource amount required for execution of the entire correlated sub-query block to an upper limit of a memory resource amount allocatable to execution of the target query. "A memory resource amount required for execution of the entire correlated sub-query block" in (s3) may be, for example, a product of the number of records extracted by execution of the main query block and subjected to execution of the correlated sub-query block and the memory resource amount required for the execution of the correlated sub-query block.

A case in which a ratio among the target query blocks is determined based on (s) is a case in which a query predicted that task execution multiplicity related to the execution of the correlated sub-query block increases (or a memory resource amount to be consumed is predicted to increase) is executed. In this case, by determining priority of each of the target query blocks based on (s), the query execution unit 423 can preferentially allocate limited memory resources to the execution of the correlated sub-query block. Consequently, the query execution unit 423 can suppress generation of a task in relation to the execution of the main query block and preferentially generate and execute a task for executing the correlated sub-query block. The execution of the correlated sub-query block is necessary for generating a result of the query. If a result of the query is generated, it is possible to release memory resources consumed in relation to the generation of the result. Therefore, the preferential execution of the correlated sub-query block leads to prioritization of the result generation of the query, that is, early release of the memory resources consumed in relation to the result generation and, therefore, leads to effective utilization of the limited memory resources.

Specific Example in which a Ratio is Determined Based on (t)

When the correlated sub-query block related to the EXISTS phrase is included in the query execution plan of the target query or when the predicted number of DB operations (or the predicted number of I/Os) based on the cost calculation or the predicted task execution multiplicity based on the DB statistical information in the main query block exceeds the predetermined value, the query block priority control unit 432 sometimes sets a ratio of the main query block higher than a ratio of the correlated sub-query block related to the EXISTS phrase.

When a ratio among the target query blocks is determined based on (t), the query execution unit 423 can suppress task execution multiplicity in the correlated sub-query block related to the EXISTS phrase. Concerning DB operations on the inside of the EXISTS phrase, because of a characteristic of the EXISTS phrase, it is sometimes unnecessary to execute all the DE operations. Therefore, by suppressing the task execution multiplicity in the correlated sub-query block related to the EXISTS phrase, in the entire query execution, it is possible to reduce the number of DB operations (the number of I/Os) to be executed and effectively utilize the limited memory resources.

Note that, in the above-mentioned case (the case in which the correlated sub-query block and the main query block are included as the target query blocks), a specific example in which priority of each of the target query blocks in Embodiment 2 will be described below based on (v) of S2206 in FIG. 23. When the number of task generation-waiting tasks 906 of the main query block exceeds a predetermined ratio with respect to the number of execution tasks 905, the query block priority control unit 432 sometimes sets priority of the main query block lower than a previous value and set priority of the correlated sub-query block higher than a previous value not to change priority of the entire target query. When a memory resource amount allocated to a task generation-waiting task of the main query block exceeds a predetermined amount, the query block priority control unit 432 may change the priority of the target query block in the same manner as described above.

Embodiment 3

Embodiment 3 will be described below. Differences from Embodiments 1 and 2 will be mainly described, and description on points common with Embodiments 1 and 2 will be omitted or simplified.

Figure 28:
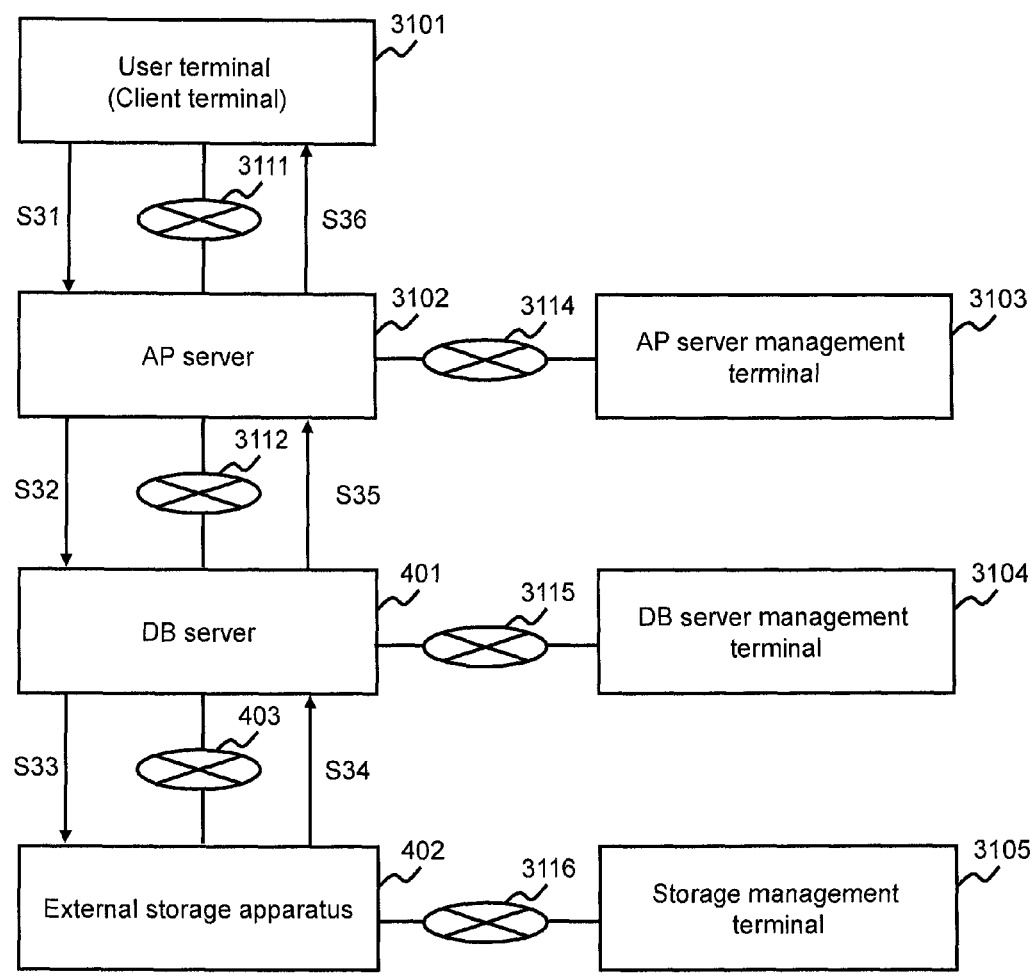
FIG. 28 shows the configuration of a computer system according to Embodiment 3.

FIG. 28 shows the configuration of a computer system according to Embodiment 3.

An application server (hereinafter, AP server) 3102 is communicably coupled to the DB server 401 via a communication network 3112. The DB server 401 is communicably coupled to the external storage apparatus 402 via the communication network 403. A user terminal (a client terminal) 3101 is communicably coupled to the AP server 3102 via a communication network 3111. The DB server 401 executes the DBMS 412 that manages the DB 451. The external storage apparatus 402 stores the DB 451. The AP server 3102 executes an AP for issuing a query to the DBMS 412 executed by the DB server 401. The user terminal 3101 issues a request to the AP executed by the AP server 3102. Note that a plurality of the user terminals 3101 and a plurality of the AP server 3102 may be present.

An AP server management terminal 3103 is coupled to the AP server 3102 via a communication network 3114. The DB server management terminal 3104 is coupled to the DB server 401 via a communication network 3115. The storage management terminal 3105 is coupled to the external storage apparatus 402 via a communication network 3116. The AP server management terminal 3103 is a terminal that manages the AP server 3102. The DB server management terminal 3104 is a terminal that manages the DB server 401. The storage management terminal 3105 is a terminal that manages the external storage apparatus 402. A DB server administrator or user may set, from the DB server management terminal 3104, the priority 901, the highest priority flag 902, and the like corresponding to a partial query in the query execution management table 424. Note that at least two of the management terminals 3103 to 3105 may be common (integral). At least two of the communication networks 3111, 3112, 3114, 3115, 3116, and 403 may be common (integral).

In Embodiment 3, processing is executed as described below.

(S31) The user terminal 3101 issues a request (hereinafter, user request) to the AP server 3102.

(S32) The AP server 3102 generates a query according to the user request received in S31. The AP server 3102 issues the generated query to the DB server 401.

(S33) The DB server 401 receives the query from the AP server 3102 and executes the received query. The DB server 401 issues a data input and output request (e.g., a data read request), which is necessary in the execution of the received query, to the external storage apparatus 402. The DB server 401 sometimes issues a plurality of data input and output requests in parallel in execution of one query. Therefore, the DB server 401 sometimes performs the request in S33 a plurality of times in parallel in the execution of one query.

(S34) The external storage apparatus 402 responds to the DB server 401 concerning the data input and output request issued in S33. The external storage apparatus 402 sometimes performs the response in S34 a plurality of times in parallel.

(S35) The DB server 401 generates an execution result of the query and transmits the execution result to the AP server 3102.

(S36) The AP server 3102 receives the execution result of the query. The AP server 3102 transmits an answer to the user request received in S31, which conforms to the execution result, to the user terminal 3101.

Note that a plurality of the user requests issued to the AP server 3102 or a plurality of the queries issued to the DB server may be simultaneously present.

The several embodiments are described above. However, the present invention is not limited to these embodiments. It goes without saying that the embodiments can be variously changed without departing from the spirit of the present invention.

For example, in the first and Embodiment 2s, the magnitude of the "memory resource amount" is defined by an amount of memory resources (e.g., megabyte). However, in the present invention, the magnitude of the "memory resource amount" is not limited to this and may be defined by other units, for example, the number of tasks (i.e., how many tasks can be generated and executed from which magnitude of memory resources).

REFERENCE SIGNS LIST

412 Database management system (DBMS)
The invention claimed is:

1. A database management system for managing a database, the database management system comprising:
   a processor; and
   a memory connected to the processor, the memory storing instructions that, when executed by the processor, cause the processor to:
   receive a query to the database;
   generate a query execution plan including information representing one or more database operations necessary for executing the received query, and the generated query execution plan includes a plurality of query blocks, which are sets of one or more of the database operations necessary for executing the received query; and
   execute the received query in accordance with the generated query execution plan and, in the execution of the received query, dynamically generate a plurality of tasks for executing the database operations and execute the dynamically generated tasks,
   wherein the execution of the received query includes to execute determination processing of a plurality of task-generation numbers when newly generating the tasks in the execution of the received query,
   wherein the determination processing of the task-generation numbers includes to calculate, targeting each of the plurality of query blocks, the task-generation numbers which indicate a number of dynamically generated tasks that can be generated as the tasks for executing the target query block,
   wherein the number of the dynamically generated tasks is equal to or smaller than the task-generation number for the target query block, and
   wherein the task-generation numbers are calculated based on a ratio of each of a plurality of memory resource amounts required for the execution of each of the plurality of query blocks to an upper limit of a memory resource amount allocatable to the execution of the received query.

2. The database management system according to claim 1, wherein the determination processing of the task-generation numbers includes to calculate the task-generation numbers based on s number of generable tasks, which is a number of the tasks that can be newly generated, a first memory resource amount, which is a memory resource amount requiring allocation per task newly generated, and a second memory resource amount, which is a memory resource amount that can be newly allocated to the execution of the target query block.

3. The database management system according to claim 2, wherein the memory further stores instructions that, when executed by the processor, cause the processor to:
   determine priority corresponding to each of the plurality of query blocks and execute the query concerning the plurality of query blocks in parallel, and
   wherein, in the determination processing of the task-generation numbers, the second memory resource amount is smaller than one of third and fourth memory resource amounts,
   wherein the third memory resource amount is an amount obtained by subtracting a memory resource amount already reserved for the execution of the target query block from an amount of memory resources that is allocatable to the execution of the target query block and is obtained by distributing, according to the priority corresponding to each of the plurality of query blocks, a total memory resource amount that is a total amount of memory resources allocatable to the execution of all the query blocks, and
   wherein the fourth memory resource amount is an amount obtained by subtracting, from the total memory resource amount, a total amount of memory resource amounts already reserved for the execution of each of the plurality of query blocks.

4. The database management system according to claim 1, wherein, in the determination processing of the task-generation numbers, the task-generation numbers are calculated based on a reference relation among the plurality of query blocks.

5. The database management system according to claim 4, wherein, in the determination processing of task-generation number, the reference relation among the plurality of query blocks is, concerning other query blocks including a database (DB) operation for referring to an execution result of one query block among the plurality of query blocks, a relation between a predicted number of database operations based on a cost calculation until the reference to the execution result of the one query block and a predicted total number of database operations.

6. The database management system according to claim 1, wherein, in the determination processing of the task-generation numbers, the task-generation numbers are calculated based on an execution progress status of each of the plurality of query blocks.

7. The database management system according to claim 6, wherein, in the determination processing of the task-generation numbers, an execution progress status of each of the plurality of query blocks is a number of tasks being executed, a number of tasks waiting for a start of execution, a number of tasks waiting for generation of a new task, or an execution achievement ratio in each of the plurality of query blocks.

8. The database management system according to claim 1, wherein one query block among the plurality of query blocks is a query block corresponding to a sub-query having a correlation condition including a column of a table used in other query blocks among the plurality of query blocks, and
   wherein, in the determination processing of the task-generation numbers, when the target query block is the query block corresponding to the sub-query having the correlation condition, the task-generation numbers are calculated based on at least one of a predicted number of database operations, a predicted task execution multiplicity, and a memory resource amount required for the execution of the target query block.

9. The database management system according to claim 1, wherein one query block among the plurality of query blocks is a query block corresponding to a sub-query having, in an EXISTS phrase, a correlation condition including a column of a table used in other query blocks among the plurality of query blocks, and wherein, in the determination processing of the task-generation numbers, when the target query block is a query block corresponding to an outer side portion of the sub-query having the correlation condition in the EXISTS phrase, the task-generation numbers are calculated based on a predicted number of database operations or a predicted task execution multiplicity in the target query block.

10. The database management system according to claim 1, wherein the memory further stores instructions that, when executed by the processor, cause the processor to:

when one query block among the plurality of query blocks is a query block for executing a database operation related to an EXISTS phase, to cancel, based on an execution result of one of the tasks in the one query block, execution of a related task among the plurality of query blocks and releases memory resources allocated to the one of the tasks, the execution of which has been canceled.

11. The database management system according to claim 1, wherein the memory further stores instructions that, when executed by the processor, cause the processor to:

in execution of one query block among the plurality of query blocks, when the number of execution-waiting tasks, which are tasks waiting for a start of execution, is equal to or larger than a predetermined number or when a memory resource amount allocated to the execution-waiting tasks is equal to or larger than a predetermined amount, to cancel execution of one of the tasks related to the one query block, release memory resources allocated to the one of the tasks, the execution of which has been canceled, and set at least a part of a memory resource amount allocatable to the execution of the one query block as a memory resource amount allocatable to execution of other query blocks among the plurality of query blocks.

12. The database management system according to claim 1, wherein the memory further stores instructions that, when executed by the processor, cause the processor to:

in execution of one query block among the plurality of query blocks, when the ratio of the respective memory resource amount already allocated to the execution of the one query block to the upper limit of the memory resource amount allocatable to the execution of the one query block is equal to or smaller than a predetermined value, to select, among task generation-waiting tasks that wait for generation of a task in the one query block, a task generation-waiting task having a larger number of following database operations than database operations corresponding to the task generation-waiting tasks and preferentially generates a new task related to the selected task generation-waiting task.

13. A computer comprising:

a network adapter coupled to an external storage apparatus which stores a database;

a processor connected to the network adapter; and a memory connected to the processor, the memory storing instructions that, when executed by the processor, cause the processor to:

receive a query to a database;

generate a query execution plan including information representing one or more database operations necessary for executing the received query, and the generated query execution plan includes a plurality of query blocks, which are sets of one or more of the database operations necessary for executing the received query; and execute the received query in accordance with the generated query execution plan and, in the execution of the received query, dynamically generate a plurality of tasks for executing the database operations and execute the dynamically generated tasks, wherein the execution of the received query includes to execute determination processing of a plurality of task-generation numbers when newly generating the tasks in the execution of the received query, wherein the determination processing of the task-generation numbers includes to calculate, targeting each of the query blocks, the task-generation numbers which indicate a number of dynamically generated tasks that can be generated as the tasks for executing the target query block, and wherein the number of the dynamically generated tasks is equal to or smaller than the task-generation number for the target query block, and wherein the task-generation numbers are calculated based on a ratio of each of a plurality of memory resource amounts required for the execution of each of the plurality of query blocks to an upper limit of a memory resource amount allocatable to the execution of the received query.

14. A database management method for managing a database, the database management method comprising:

receiving a query to the database;

generating a query execution plan including information representing one or more database operations necessary for executing the received query, and the generated query execution plan including a plurality of query blocks, which are sets of one or more of the database operations necessary for executing the received query; and executing the received query in accordance with the generated query execution plan and, in the execution of the received query, dynamically generating a plurality of tasks for executing the database operations and executing the dynamically generated tasks, wherein the execution of the received query includes executing determination processing of a plurality of task-generation numbers when newly generating the tasks, wherein the determination processing of the task-generation numbers includes calculating, targeting each of the query blocks, the task-generation numbers which indicate a number of dynamically generated tasks that can be generated as the tasks for executing the query block, and wherein the number of the dynamically generated tasks is equal to or smaller than the task-generation number for the target query block, and wherein the task-generation numbers are calculated based on a ratio of each of a plurality of memory resource amounts required for the execution of each of the plurality of query blocks to an upper limit of a memory resource amount allocatable to the execution of the received query.

* * * * *